US012700321B2

(12) United States Patent
Burghardt et al.

(10) Patent No.: US 12,700,321 B2
(45) Date of Patent: Aug. 4, 2026

(54) SYSTEMS AND METHODS FOR RADAR-BASED AIRCRAFT MANEUVER ACTIONS

(71) Applicant: Joby Aero, Inc., Santa Cruz, CA (US)

(72) Inventors: Michael Burghardt, Santa Cruz, CA (US); Karsten Mueller, Karlsruhe (DE); Andreas Stelzer, Linz (AT); Heinz Haderer, Linz (AT); Simon Scott, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 363 days.

(21) Appl. No.: 18/498,924

(22) Filed: Oct. 31, 2023

(65) Prior Publication Data

US 2024/0144835 A1 May 2, 2024

Related U.S. Application Data

(60) Provisional application No. 63/420,914, filed on Oct. 31, 2022.

(51) Int. Cl.
*G08G 5/54* (2025.01)
*G01S 13/75* (2006.01)
(Continued)

(52) U.S. Cl.
CPC ............... *G08G 5/54* (2025.01); *G01S 13/75* (2013.01); *G01S 13/913* (2013.01); *G08G 5/50* (2025.01);
(Continued)

(58) Field of Classification Search
CPC .. G08G 5/54; G08G 5/21; G08G 5/55; G08G 5/50; G08G 5/22; G08G 5/70; G01S 13/935; G01S 13/75; G01S 13/913
See application file for complete search history.

(56) References Cited

U.S. PATENT DOCUMENTS 3,035,789 A 5/1962 Young
4,022,405 A 5/1977 Peterson
(Continued)

FOREIGN PATENT DOCUMENTS

EP 0945841 A1 9/1999
EP 2698749 A1 2/2014
(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.
(Continued)

*Primary Examiner* — Jay Khandpur
(74) *Attorney, Agent, or Firm* — Dority & Manning, P.A.

(57) ABSTRACT

Systems and methods for radar-based aircraft maneuver actions are provided. An example computer-implemented method includes transmitting, using one or more transmitters onboard an aircraft, one or more radio signals. Reflected radio data corresponding to one or more radio signals reflected from a plurality of radio detection and ranging ("radar") reflectors placed at a plurality of locations associated with an aerial facility can be received using one or more radio receivers onboard the aircraft. A location for the aircraft can be computed based on the radio data and the plurality of locations associated with the aerial facility at which the radar reflectors are placed. A maneuver action for the aircraft can be initiated at a particular landing pad of the aerial facility based on the location.

19 Claims, 11 Drawing Sheets

(51) Int. Cl.

| | |
|---|---|
| *G01S 13/91* | (2006.01) |
| *G01S 13/935* | (2020.01) |
| *G08G 5/21* | (2025.01) |
| *G08G 5/22* | (2025.01) |
| *G08G 5/50* | (2025.01) |
| *G08G 5/55* | (2025.01) |
| *G08G 5/70* | (2025.01) |

(52) U.S. Cl.
CPC ................. *G08G 5/55* (2025.01); *G08G 5/70* (2025.01); *G01S 13/935* (2020.01); *G08G 5/21* (2025.01); *G08G 5/22* (2025.01)

(56) References Cited

U.S. PATENT DOCUMENTS

| | | | |
|---|---|---|---|
| 5,823,468 A | 10/1998 | Bothe | |
| 5,839,691 A | 11/1998 | Lariviere | |
| 5,842,667 A | 12/1998 | Jones | |
| 6,268,822 B1* | 7/2001 | Sanders | H01Q 1/281 |
| | | | 343/753 |
| 6,343,127 B1 | 1/2002 | Billoud | |
| 6,892,980 B2 | 5/2005 | Kawai | |
| 8,016,226 B1 | 9/2011 | Wood | |
| 8,020,804 B2 | 9/2011 | Yoeli | |
| 8,311,686 B2 | 11/2012 | Herkes et al. | |
| 8,733,690 B2 | 5/2014 | Bevirt et al. | |
| 8,737,634 B2 | 5/2014 | Brown et al. | |
| 8,849,479 B2 | 9/2014 | Walter | |
| 9,205,930 B2 | 12/2015 | Yanagawa | |
| 9,387,928 B1 | 7/2016 | Gentry et al. | |
| 9,415,870 B1 | 8/2016 | Beckman et al. | |
| 9,422,055 B1 | 8/2016 | Beckman et al. | |
| 9,435,661 B2 | 9/2016 | Brenner et al. | |
| 9,442,496 B1 | 9/2016 | Beckman et al. | |
| 9,550,561 B1 | 1/2017 | Beckman et al. | |
| 9,663,237 B2 | 5/2017 | Senkel et al. | |
| 9,694,911 B2 | 7/2017 | Bevirt et al. | |
| 9,771,157 B2 | 9/2017 | Gagne et al. | |
| 9,786,961 B2 | 10/2017 | Dyer et al. | |
| 9,802,702 B1 | 10/2017 | Beckman et al. | |
| 9,816,529 B2 | 11/2017 | Grissom et al. | |
| 9,838,436 B2 | 12/2017 | Michaels | |
| 10,140,873 B2 | 11/2018 | Adler et al. | |
| 10,152,894 B2 | 12/2018 | Adler et al. | |
| 10,216,190 B2 | 2/2019 | Bostick et al. | |
| 10,249,200 B1 | 4/2019 | Grenier et al. | |
| 10,304,344 B2 | 5/2019 | Moravek et al. | |
| 10,330,482 B2 | 6/2019 | Chen et al. | |
| 10,593,215 B2 | 3/2020 | Villa | |
| 10,593,217 B2 | 3/2020 | Shannon | |
| 10,752,365 B2 | 8/2020 | Galzin | |
| 10,759,537 B2 | 9/2020 | Moore et al. | |
| 10,768,201 B2 | 9/2020 | Luo et al. | |
| 10,832,581 B2 | 11/2020 | Westervelt et al. | |
| 10,836,470 B2 | 11/2020 | Liu et al. | |
| 10,913,528 B1 | 2/2021 | Moore et al. | |
| 10,948,910 B2 | 3/2021 | Taveira et al. | |
| 10,960,785 B2 | 3/2021 | Villanueva et al. | |
| 11,130,566 B2 | 9/2021 | Mikic et al. | |
| 11,145,211 B2 | 10/2021 | Goel et al. | |
| 11,238,745 B2 | 2/2022 | Villa et al. | |
| 11,295,622 B2 | 4/2022 | Goel et al. | |
| 2010/0079342 A1 | 4/2010 | Smith et al. | |
| 2014/0074324 A1* | 3/2014 | Burgin | G01C 23/00 |
| | | | 701/9 |
| 2014/0179535 A1 | 6/2014 | Stückl et al. | |
| 2016/0311529 A1 | 10/2016 | Brotherton-Ratcliffe et al. | |
| 2017/0197710 A1 | 7/2017 | Ma | |
| 2017/0297737 A1* | 10/2017 | Arnold | G01S 19/46 |
| 2017/0357914 A1 | 12/2017 | Tulabandhula et al. | |
| 2018/0018887 A1 | 1/2018 | Sharma et al. | |
| 2018/0053425 A1 | 2/2018 | Adler et al. | |
| 2018/0216988 A1 | 8/2018 | Nance | |
| 2018/0308366 A1 | 10/2018 | Goel et al. | |
| 2018/0354636 A1 | 12/2018 | Darnell et al. | |
| 2019/0146508 A1 | 5/2019 | Dean et al. | |
| 2019/0221127 A1 | 7/2019 | Shannon | |
| 2019/0316849 A1 | 10/2019 | Abrego et al. | |
| 2020/0103922 A1 | 4/2020 | Nonami et al. | |
| 2020/0142410 A1* | 5/2020 | Liu | G01C 21/3848 |
| 2020/0388166 A1 | 12/2020 | Rostamzadeh et al. | |
| 2021/0407306 A1* | 12/2021 | Nielsen | G01W 1/02 |
| 2023/0192313 A1* | 6/2023 | Pos | B64D 45/04 |
| | | | 701/15 |

FOREIGN PATENT DOCUMENTS

| | | | |
|---|---|---|---|
| EP | 3499634 A1 | 6/2019 | |
| JP | 2010095246 A | 4/2010 | |
| JP | 2013086795 A | 5/2013 | |
| WO | WO 2018023556 A1 | 2/2018 | |
| WO | WO 2019089677 A1 | 5/2019 | |
| WO | WO 2020252024 A1 | 12/2020 | |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

\* cited by examiner

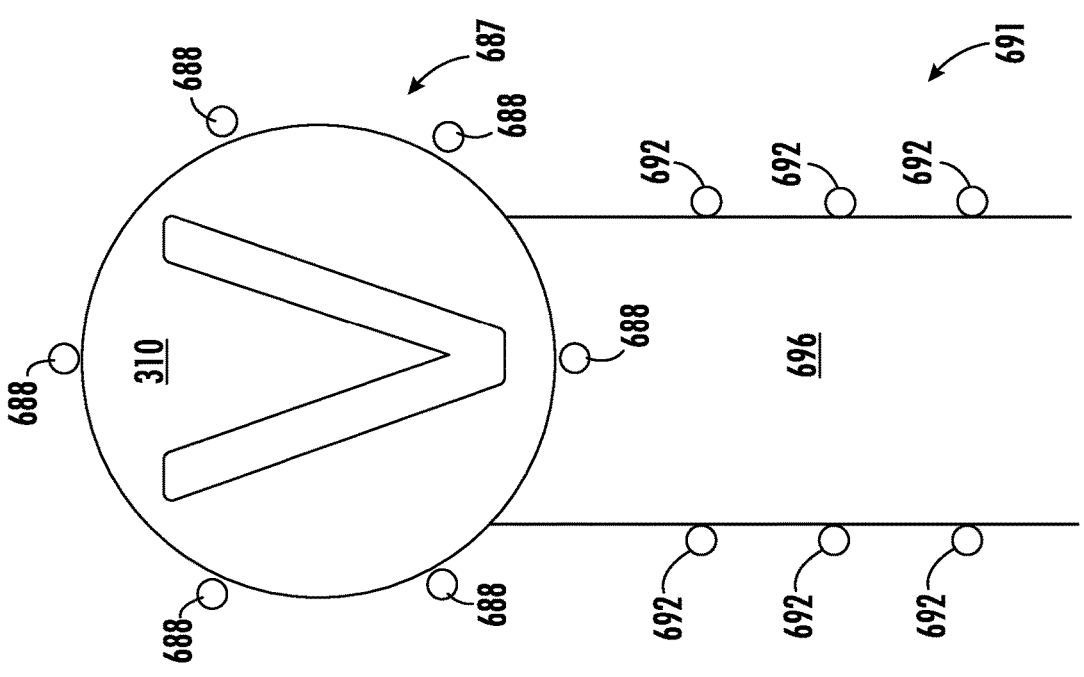
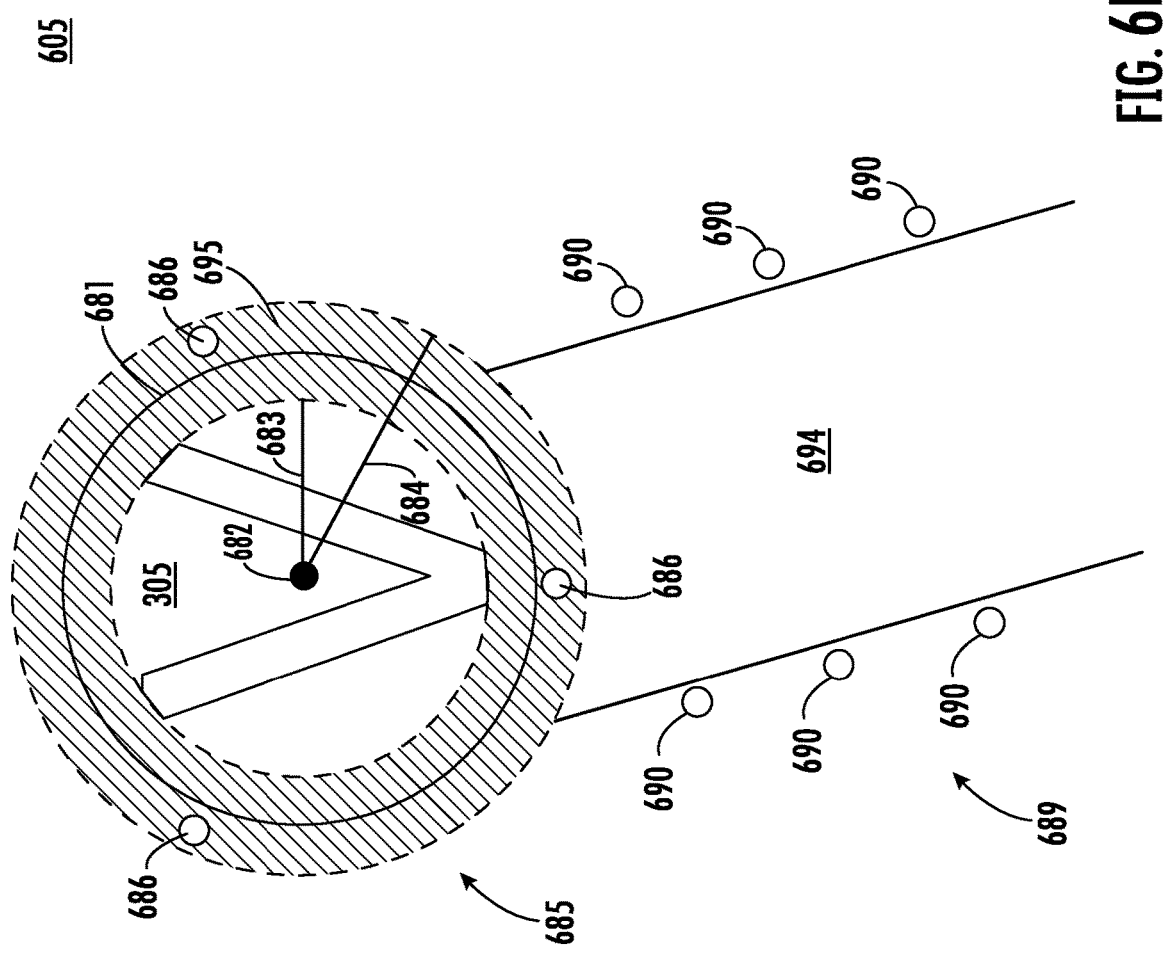
FIG. 6B

700

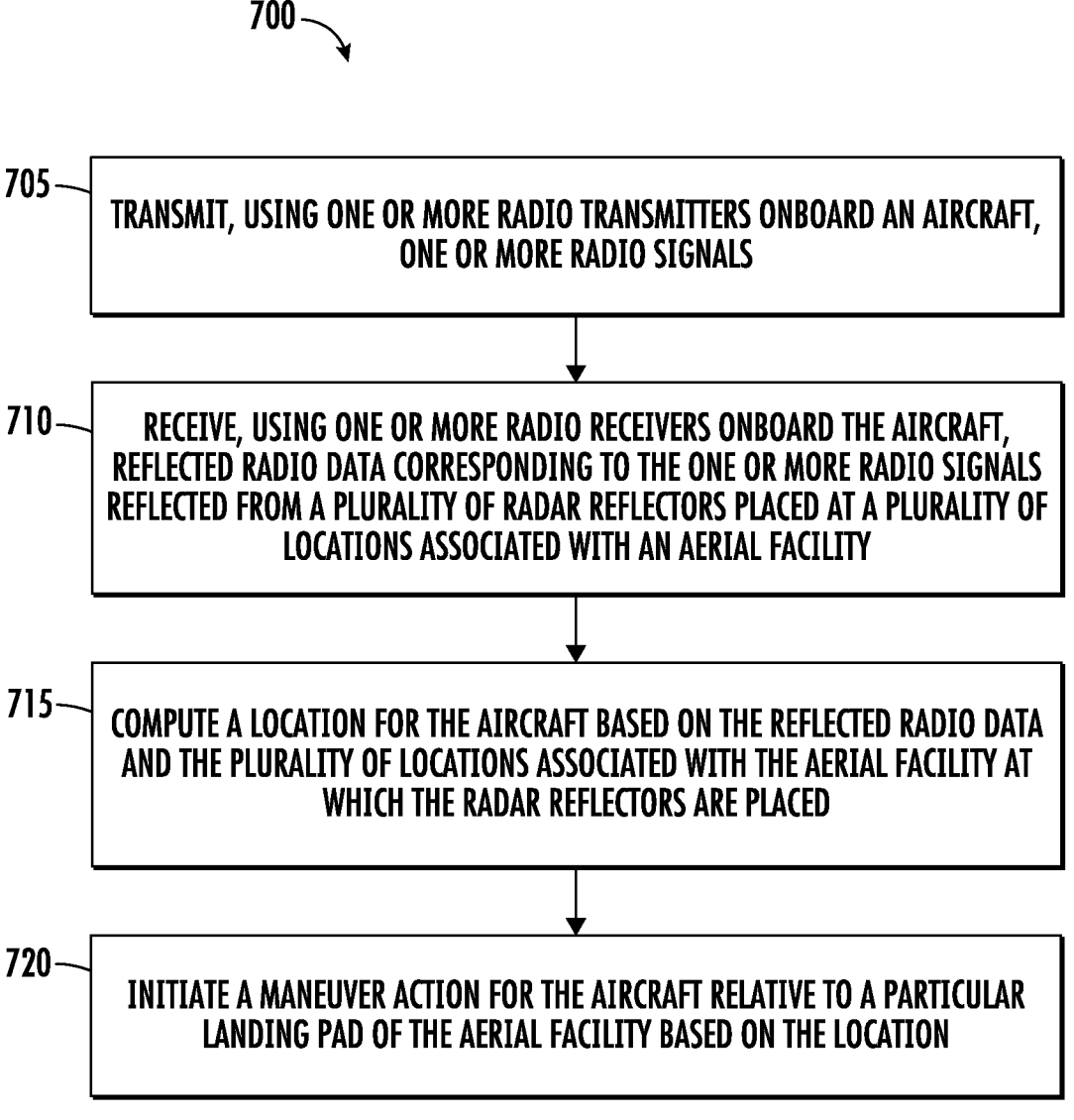

705 — TRANSMIT, USING ONE OR MORE RADIO TRANSMITTERS ONBOARD AN AIRCRAFT, ONE OR MORE RADIO SIGNALS

710 — RECEIVE, USING ONE OR MORE RADIO RECEIVERS ONBOARD THE AIRCRAFT, REFLECTED RADIO DATA CORRESPONDING TO THE ONE OR MORE RADIO SIGNALS REFLECTED FROM A PLURALITY OF RADAR REFLECTORS PLACED AT A PLURALITY OF LOCATIONS ASSOCIATED WITH AN AERIAL FACILITY

715 — COMPUTE A LOCATION FOR THE AIRCRAFT BASED ON THE REFLECTED RADIO DATA AND THE PLURALITY OF LOCATIONS ASSOCIATED WITH THE AERIAL FACILITY AT WHICH THE RADAR REFLECTORS ARE PLACED

720 — INITIATE A MANEUVER ACTION FOR THE AIRCRAFT RELATIVE TO A PARTICULAR LANDING PAD OF THE AERIAL FACILITY BASED ON THE LOCATION

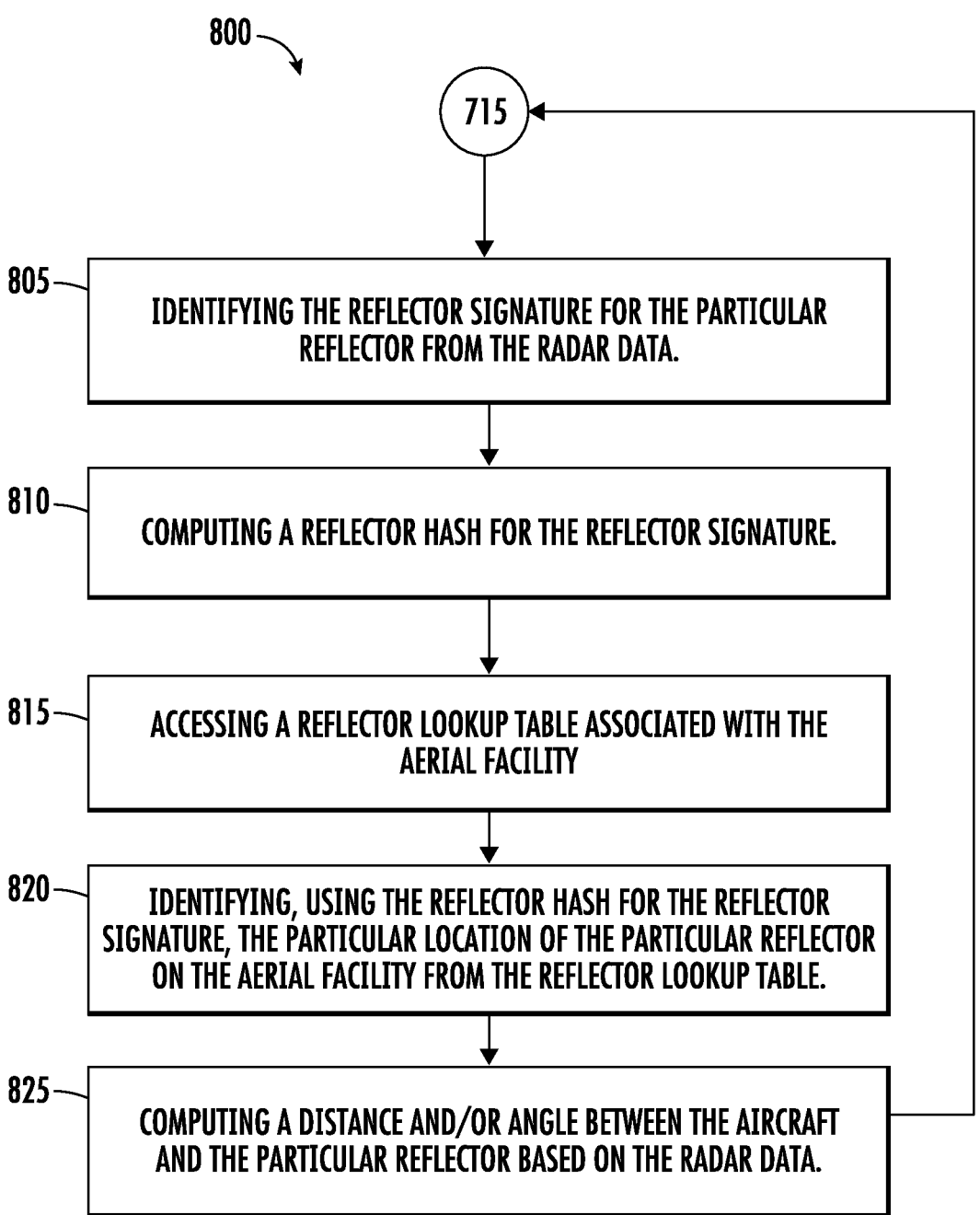

715

805 — IDENTIFYING THE REFLECTOR SIGNATURE FOR THE PARTICULAR REFLECTOR FROM THE RADAR DATA.

810 — COMPUTING A REFLECTOR HASH FOR THE REFLECTOR SIGNATURE.

815 — ACCESSING A REFLECTOR LOOKUP TABLE ASSOCIATED WITH THE AERIAL FACILITY

820 — IDENTIFYING, USING THE REFLECTOR HASH FOR THE REFLECTOR SIGNATURE, THE PARTICULAR LOCATION OF THE PARTICULAR REFLECTOR ON THE AERIAL FACILITY FROM THE REFLECTOR LOOKUP TABLE.

825 — COMPUTING A DISTANCE AND/OR ANGLE BETWEEN THE AIRCRAFT AND THE PARTICULAR REFLECTOR BASED ON THE RADAR DATA.

905 — IDENTIFYING A FIRST ARRANGEMENT OF THE RADAR REFLECTORS BASED ON THE RADAR DATA.

910 — IDENTIFYING THE PARTICULAR LANDING PAD BASED ON THE ARRANGEMENT.

SYSTEMS AND METHODS FOR RADAR-BASED AIRCRAFT MANEUVER ACTIONS

PRIORITY CLAIM

This application claims priority to and the benefit of U.S. Provisional Patent Application No. 63/420,914 filed Oct. 31, 2022, which is incorporated by reference herein in its entirety.

FIELD

The present disclosure relates generally to improving the maneuvering of a vertical take-off and landing (VTOL) aircraft relative to a landing pad of an aerial facility. For example, the present disclosure determines location for an aircraft based on reflected radio data including radar signals reflected from one or more arrangements of radar reflectors strategically placed at or within proximity of a landing pad of an aerial facility.

BACKGROUND

A vertical take-off and landing (VTOL) aircraft can transition from a vertical takeoff state to travel vertically and a cruise state to move forward. For example, a vertical takeoff state can use propellers to generate lift. The cruise state uses wings to generate lift and rotate the propellers to generate thrust. Similar elements can be used for landing the VTOL. The VTOL can utilize this functionality to transport passengers from one location to another. Transportation service applications can allow passengers to request transportation and computing platforms can be used to help facilitate these services.

SUMMARY

Aspects and advantages of implementations of the present disclosure will be set forth in part in the following description, or may be learned from the description, or may be learned through practice of the implementations.

One example aspect of the present disclosure is directed to a computer-implemented method. The method includes transmitting, using one or more radio transmitters onboard an aircraft, one or more radio signals. The method includes receiving, using one or more radio receivers onboard the aircraft, reflected radio data corresponding to the one or more radio signals reflected from a plurality of radio detection and ranging ("radar") reflectors placed at a plurality of locations associated with an aerial facility. The method includes computing a location for the aircraft based on the reflected radio data and the plurality of locations associated with the aerial facility at which the radar reflectors are placed. The method includes initiating a maneuver action for the aircraft at a particular landing pad of the aerial facility based on the location.

Other example aspects of the present disclosure are directed to other systems, methods, vehicles, apparatuses, tangible non-transitory computer-readable media, and devices for determining an absolute and/or relative location of a VTOL aircraft and identifying particular landing pads, as well as maneuvering and controlling aircraft and other vehicles relative to a landing pad of an aerial facility.

These and other features, aspects and advantages of various implementations will become better understood with reference to the following description and appended claims.

The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 6B depicts an overhead view of an example aerial facility with arrangements of radar reflectors according to example embodiments of the present disclosure.

FIG. 7 depicts a flowchart diagram of an example method for computing an absolute location for the aircraft according to example embodiments of the present disclosure.

FIG. 8 depicts a flowchart diagram of an example method for computing an absolute location for the aircraft using a radar signature according to example embodiments of the present disclosure.

DETAILED DESCRIPTION

Figure 1:
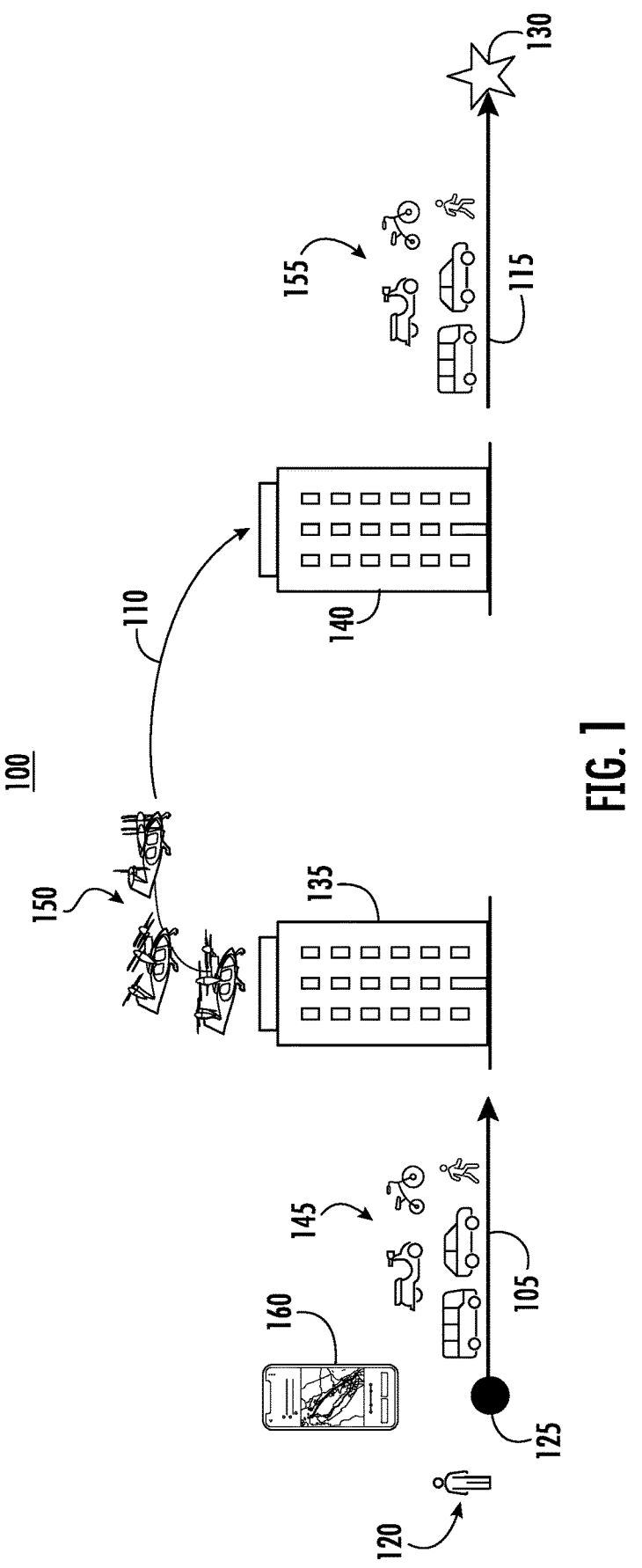
FIG. 1 depicts an example multi-modal transportation service according to example implementations of the present disclosure.

Generally, the present disclosure is directed to improved techniques for maneuvering a vertical take-off and landing (VTOL) aircraft relative to a landing pad of an aerial facility. Although the subject techniques are described relative to VTOL aircraft, it should be appreciated that the techniques can also apply to other aircraft, such as but not limited to conventional fixed wing aircraft (e.g., airplanes), rotary wing aircraft (e.g., helicopters, quadcopters, gyrocopters), and the like.

For example, in different aspects of flight navigation, an aircraft can determine its location relative to a landing area using the Global Positioning System (GPS) or other Global Navigation Satellite System (GNSS) or other techniques such as distance measuring equipment (DME) or instrument landing systems (ILS). The accuracy of these navigational techniques may vary in certain environment and/or communication-limited conditions. Moreover, they generally provide coarse positioning estimates that may, in certain situations, be less reliable and provide limited information for landing an aircraft. More particularly, conventional GPS and/or GNSS techniques can lack the availability, continuity, and integrity of the position solution needed for accurate aircraft localization. For example, positioning estimates determined primarily using GNSS systems may not be sufficient to reliably localize a VTOL aircraft with respect to a precise landing pad in a potentially high trafficked area. Even for runways, current GNSS technology does not enable automated landings with required integrity. Instead, a pilot manually takes over landing controls below a certain decision height, for example 200 feet or 100 feet. Some ILS installed at runways can be used for positioning and automated landings until touchdown, but the technology has several disadvantages including high cost, size of ground-based infrastructure, limitations on use with vertiports because ILS approach path needs to be straight, and/or multipath signal propagation in urban environments that would cause large errors.

According to the technology of the present disclosure, a computing system can aid the navigation of an aircraft within a proximity of a landing pad by computing an absolute location for the aircraft that does not rely on GPS, DME, or ILS.

To do so, the computing system can include a plurality of radio detection and ranging ("radar") systems that interact with one or more arrangements of radar reflectors strategically placed at or within a proximity of an aerial facility. The computing system's radar systems can transmit radio signals as an aircraft approaches the aerial facility which can be reflected by a subset of the radar reflectors placed at or within a proximity of the aerial facility. The computing system's radar systems can include radio receivers that can receive reflected radio data including the radio signals reflected from the subset of radar reflectors.

The computing system can process the radio data to compute a location (e.g., an absolute location and/or a relative location) for the aircraft. The reflected radio data can be processed to compute one or more location parameters (e.g., distance and/or angle) relative to each of the radar reflectors within the field of view of the computing system. The location can be computed based on one or more of: (i) the distance from each of the radar reflectors and/or (ii) the angle (azimuth/elevation) relative to each of the radar reflectors.

In some implementations, computing a location for the aircraft includes computing a relative location for the aircraft. For example, the relative location of the aircraft can be determined in relation to at least one of the particular landing pad or the aerial facility. Subsequent maneuver actions for the aircraft can be based on the relative location of the aircraft.

In some implementations, origin data indicate of a coordinate frame in which the relative location for the aircraft is expressed can additionally be accessed. An absolute location for the aircraft can then be computed based on the relative location for the aircraft and the origin data indicative of the coordinate frame. Subsequent maneuver actions for the aircraft can be additionally or alternatively based on the absolute location of the aircraft, determined at least in part from the relative location.

In some implementations, the absolute location for the aircraft can be computed based on the position of each of the radar reflectors. For instance, the computing system can identify a plurality of radar signatures from the reflected radio data that respectively correspond to each radar reflector within the computing system's field of view. The computing system can access a reflector lookup table that stores positional information for each of the radar reflectors and search the reflector lookup table using the identified radar signatures to identify the respective positions of each of the radar reflectors. The computing system can compute the absolute location of the aircraft based on the measured and/or computed distances and/or angles from and the positions of each of the radar reflectors within the computing system's field of view. For example, one or more regression analysis techniques (e.g., least squares method) can be used to find a best fit of data points indicative of the location information.

The radar reflectors can be placed in a specific arrangement at the aerial facility to help accurately compute the location. In some aspects, the specific arrangement can include an asymmetrical pattern (e.g., an offset star pattern) of omni-directional radar reflectors placed at different locations along the perimeter or exterior of a landing pad. In some aspects, the specific arrangement can include directional reflectors placed at different locations (e.g., various offset locations) along a predefined approach path to the landing pad.

The computing system can initiate a maneuver action for the aircraft at the landing pad of the aerial facility based on the computed location. The maneuver action can include: (i) providing a navigation instruction for navigating the aircraft to the landing pad; (ii) providing a landing assistance instruction for indicating a relative location of the aircraft with respect to the landing pad; and/or (iii) providing a motion control instruction for controlling motion of the aircraft relative to the particular landing pad. A motion control instruction can be configured to control at least one of an approach maneuver, a final descent maneuver, a landing maneuver, a hover maneuver, a takeoff maneuver, an initial ascent maneuver, or a departure maneuver relative to the particular landing pad.

In some aspects, a motion control instruction can be configured to control motion of the aircraft below a predetermined elevation relative to a particular landing pad and/or aerial facility. In some aspects, the predetermined elevation can be based on one or more operational parameters of the computing system, including but not limited to the communication range of the plurality of radio transmitters and the plurality of radio receivers located onboard the aircraft, the positioning of the radar reflectors associated with an aerial facility and/or landing pad, the field of view of the aircraft radio transmitters/receivers relative to the radar reflectors, etc. In some aspects, the predetermined elevation is about 1,000 feet. In some aspects, the predetermined elevation is about 200 feet. In some aspects, the predetermined elevation is about 100 feet. In some aspects, the predetermined elevation is about 30 feet (or about 10 meters). Providing instructions for controlling motion of an aircraft, particularly a VTOL aircraft in an urban environment, below such predetermined elevations can be especially beneficial for maneuvers such as final descent maneuvers, landing maneuvers, takeoff maneuvers, initial ascent/climb maneuvers and/or hovering maneuvers where precise maneuvering relative to landing pads is of critical importance for effective aircraft performance.

The technology of the present disclosure can provide a number of benefits and technical effects. For instance, the technology of the present disclosure can enable an aircraft to reliably compute accurate location estimates with respect to an aerial facility. The technology disclosed herein presents a new technique for localizing an aircraft with respect to an aerial facility based on newly available radar information enabled by a plurality of strategically arranged radar reflectors. This new data can be practically utilized to improve aerial localization, especially with respect to landing pads for VTOL aircraft. The use of this technology can improve the maneuverability, performance, and fuel efficiency of a VTOL aircraft. In this way, the systems and methods of the present disclosure provide a technical improvement to aircraft navigation, in general, and, more specifically, to VTOL aircraft landing operations.

FIG. 1 depicts an example multi-modal transportation service 100 according to example implementations of the present disclosure. A multi-modal transportation service 100 can include multiple transportation legs 105, 110, 115 associated with at least two different transportation modalities. For example, the multi-modal transportation service 100 can include a three-leg transportation service with a first transportation leg 105, an intermediate transportation leg 110, and a last transportation leg 115. In some implementations, the multi-modal transportation service 100 can include more than one intermediate leg 110. A combination of ground-based vehicles, aircraft, and/or other types of vehicles can be utilized to perform the various legs of the multi-modal transportation service 100.

The multi-modal transportation service 100 can be provided in an on-demand manner as a ridesharing/ride-hailing or delivery service. As will be further described herein, the multi-modal transportation service 100 can be coordinated by one or more service entities (e.g., transportation network companies, vehicle fleet managers, etc.). For example, a user 120 may desire to travel from an origin location 125 to a destination location 130. The user 120 can interact with a software application of a service entity (e.g., a rider application) through a user device 160. The user device 160 can present the user 120 with one or more options for traveling from the origin location 125 to the destination location 130. The user 120 can interact with the user device 160 (e.g., via a user interface of the software application) to book an option for transportation.

At least one of the options for transporting the user 120 to the destination location 130 can include the multi-modal transportation service 100. For example, during the first transportation leg 105, a vehicle can transport the user 120 from the origin location 125 to a first intermediate location 135. The first intermediate location 135 can be a first structure or area for transitioning the user 120 between transportation legs or modalities. During the intermediate transportation leg 110, another vehicle can transport the user 120 from the first intermediate location 135 to a second intermediate location 140. The second intermediate location 140 can be a second structure or area for transitioning the user 120 between transportation legs or modalities. During the last transportation leg 115, yet another vehicle can transport the user 120 from the second intermediate location 140 to the destination location 130.

Each transportation leg of the multi-modal transportation service 100 can be associated with a respective transportation modality. For instance, the first transportation leg 105 can be associated with a first transportation modality 145. The intermediate transportation leg 110 can be associated with an intermediate transportation modality 150. The last transportation leg 115 can be associated with a last transportation modality 155.

The transportation modalities 145, 150, 155 can include different transportation modalities synchronized to more efficiently transport the user 120 from the origin location 125 to the destination location 130. For instance, one or more of the transportation legs (e.g., legs 105, 115) can include one or more types of ground-based transportation modalities.

The ground-based transportation modality(ies) can include travel by foot or travel via one or more ground-based vehicles. The ground-based vehicles can include manual/electric scooters, manual/electric bikes, motorcycles, autonomous/human operated cars, buses, trains, subways, or any other vehicle capable of traveling on the ground.

The transportation modalities 145, 150, 155 used in the multi-modal transportation service 100 can include a number of different aerial-based transportation modalities. The aerial-based transportation modalities can include one or more different aircraft such as airplanes, vertical take-off and landing vehicles ("VTOLs"), or other aircraft. The aircraft, for example, can include one or more different types of rotorcraft (e.g., helicopters, quadcopters, gyrocopters, etc.), tilt-rotor aircraft, powered-lift vehicles, and/or any other vehicle capable of vertically taking-off and/or landing (e.g., without a runway). As shown in FIG. 1, the aircraft used in the multi-modal transportation service 100 can include a hybrid VTOL that is configured to operate in multiple flight modes. For example, an aircraft can include multirotor configurations such that the position, orientation, etc. of the aircraft's rotors can be adjusted to allow the aircraft to operate in the various flight modes. This can include, for example, a first rotor position that allows the aircraft to take-off, land, or hover vertically and a second rotor position that allows the aircraft to travel forward (e.g., "cruise") using a thrust force. The aircraft can include one or more types of power sources such as batteries, a combustible fuel source, or a combination thereof. For example, the aircraft can include electric VTOLs ("eVTOLs") capable of operating using one or more electric batteries, VTOLs capable of operating using combustible fuel, or VTOLs using hybrid propulsion systems.

The multi-modal transportation service 100 can combine ground-based and aerial-based transportation modalities to efficiently transport the user 120. By way of example, the user 120 can interact with the user device 160 (e.g., a software application running thereon) to select or input the origin location 125, the destination location 130, and/or any user preferences for transportation. A service entity can determine that a multi-modal transportation service 100 is available for the user 120 to travel between the origin location 125 and the destination location 130. For instance, the first transportation modality 145 of the first transportation leg 105 can include a first ground-based vehicle (e.g., a first car) transporting the user 120 from the origin location 125 to the first intermediate location 135. The intermediate transportation modality 150 of the intermediate transportation leg 110 can include an aircraft (e.g., a VTOL) transporting the user 120 from the first intermediate location 135 to the second intermediate location 140. The last transportation modality 155 of the last transportation leg 115 can include a second ground-based vehicle (e.g., a second car) transporting the user 120 from the second intermediate location 140 to the destination location 130. The service entity can synthesize the multi-modal transportation service 100 for presentation to the user 120 through a user interface displayed via the user device 160. The user 120 can select the multi-modal transportation service 100 and the service entity can generate an itinerary for the user 120.

Figure 2:
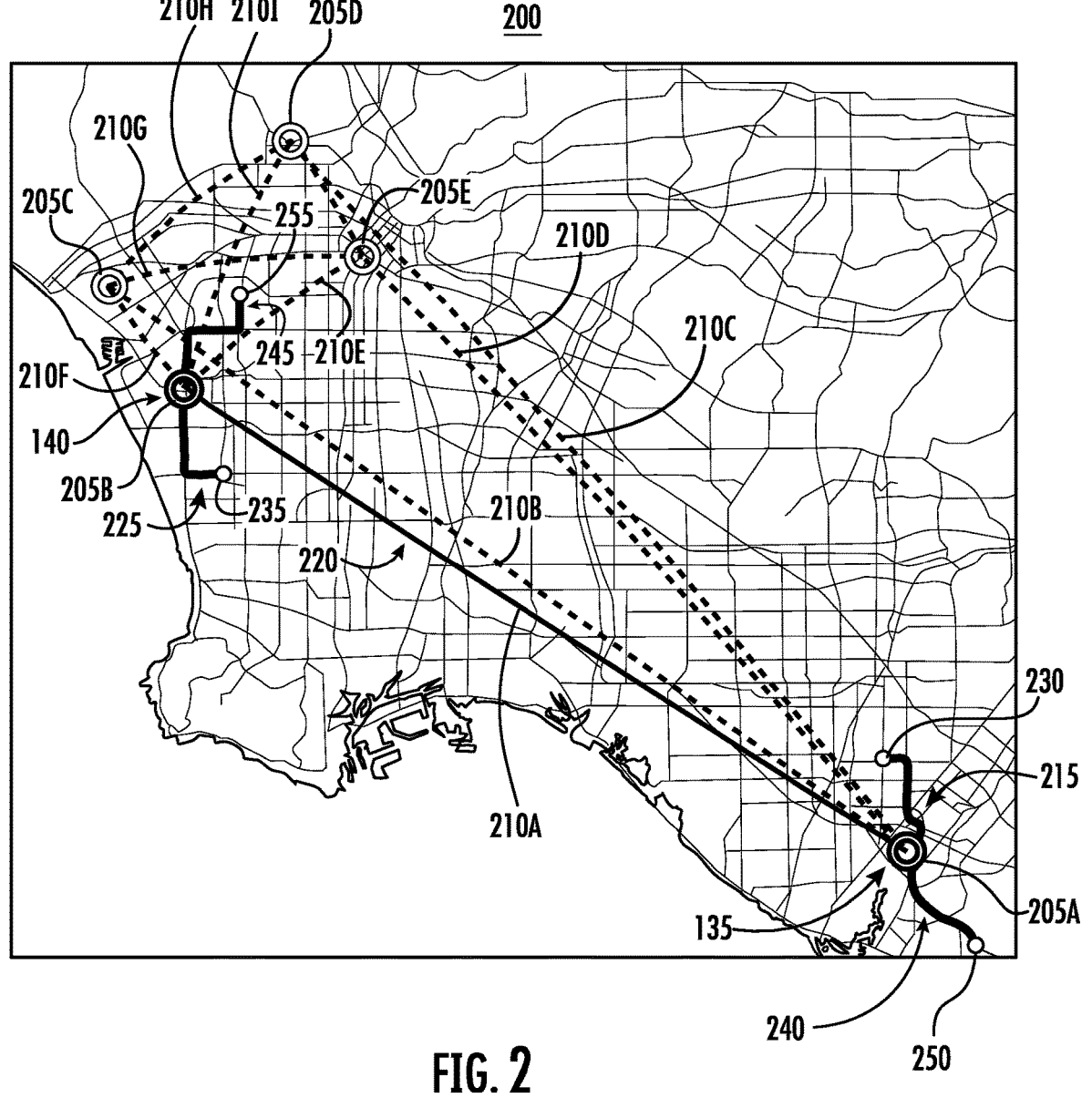
FIG. 2 depicts a map diagram of an example multi-modal transportation itinerary and aerial routes according to example implementations of the present disclosure.

The itinerary of the user 120 can be based on the user's origin location, destination location, available intermediate locations for transitioning between transportation modalities, vehicle routes, and/or other information. For example, FIG. 2 depicts a graphical map diagram of an example multi-modal transportation service within a geographic area 200 according to example implementations of the present disclosure. The geographic area 200 can be, for example, an urban environment. The geographic area 200 can include a network of intermediate locations that can be used for transitioning a user from one transportation modality to another. For instance, the geographic area 200 can include a plurality of aerial facilities 205A-E. The aerial facilities 205A-E (e.g., vertiports) can allow a user to transition from a ground-based transportation modality to an aerial-based transportation modality, or vice versa. The plurality of aerial facilities 205A-E can be placed at various locations within the geographic area 200. The plurality of aerial facilities 205A-E can be connected by a plurality aerial routes 210A-J. In some implementations, the aerial routes 210A-J can be designed with respect to airspace constraints (e.g., noise constraints, air traffic constraints, etc.). In some implementations, demand modeling can be performed to select high value infrastructure locations for placing the plurality of aerial facilities 205A-E throughout the geographic area 200 and generating routes 210A-J between the aerial facilities 205A-E, without interfering with the airspace constraints. This network of aerial facilities 205A-E and routes 210A-J can be utilized to create flight plans for aircraft used within the multi-modal transportation service 100 to indicate how and where a particular aircraft may travel through an operational time period.

Multiple users can be pooled together for multi-modal transportation services, such that different user itineraries can share at least one transportation leg. This can include pooling users to share an intermediate transportation leg (e.g., a flight on an aircraft), even though the users may have different origin or destination locations.

By way of example, a first user itinerary for a first user can include three transportation legs 215, 220, and 225 (shown in bold in FIG. 2). The first user itinerary can include transporting the first user from a first origin location 230 to a first intermediate location (e.g., aerial facility 205A) to a second intermediate location (e.g., aerial facility 205B) and, ultimately, to a first destination location 235. The first and second intermediate locations can be determined based on their proximity (e.g., being the closest aerial facilities) to the first origin location 230 and the first destination location 235, respectively. The first user itinerary can include ground-based transportation modalities (e.g., cars, etc.) along the first and last transportation legs 215, 225 and an aerial-based transportation modality (e.g., VTOLs) along the intermediate transportation leg 220.

A second user itinerary for a second user can include three transportation legs 240, 220, and 245 (shown in bold in FIG. 2). The second user itinerary can include transporting the second user from a second origin location 250 to the first intermediate location (e.g., aerial facility 205A) to the second intermediate location (e.g., aerial facility 205B) and, ultimately, to a second destination location 255. The second user itinerary can include ground-based transportation modalities along the first and last transportation legs 240, 245 and an aerial-based transportation modality along the intermediate transportation leg 220.

The first user and the second user can be pooled together for the intermediate transportation leg 220. For example, the first user itinerary and the second user itinerary can respectively indicate that the first user and the second user are to travel in the same flight of an aircraft traveling along route 210A, to transport the users between aerial facility 205A and aerial facility 205B. In this manner, the first and second users can share at least one transportation leg for cost and power efficient multi-modal transportation.

Figure 3:
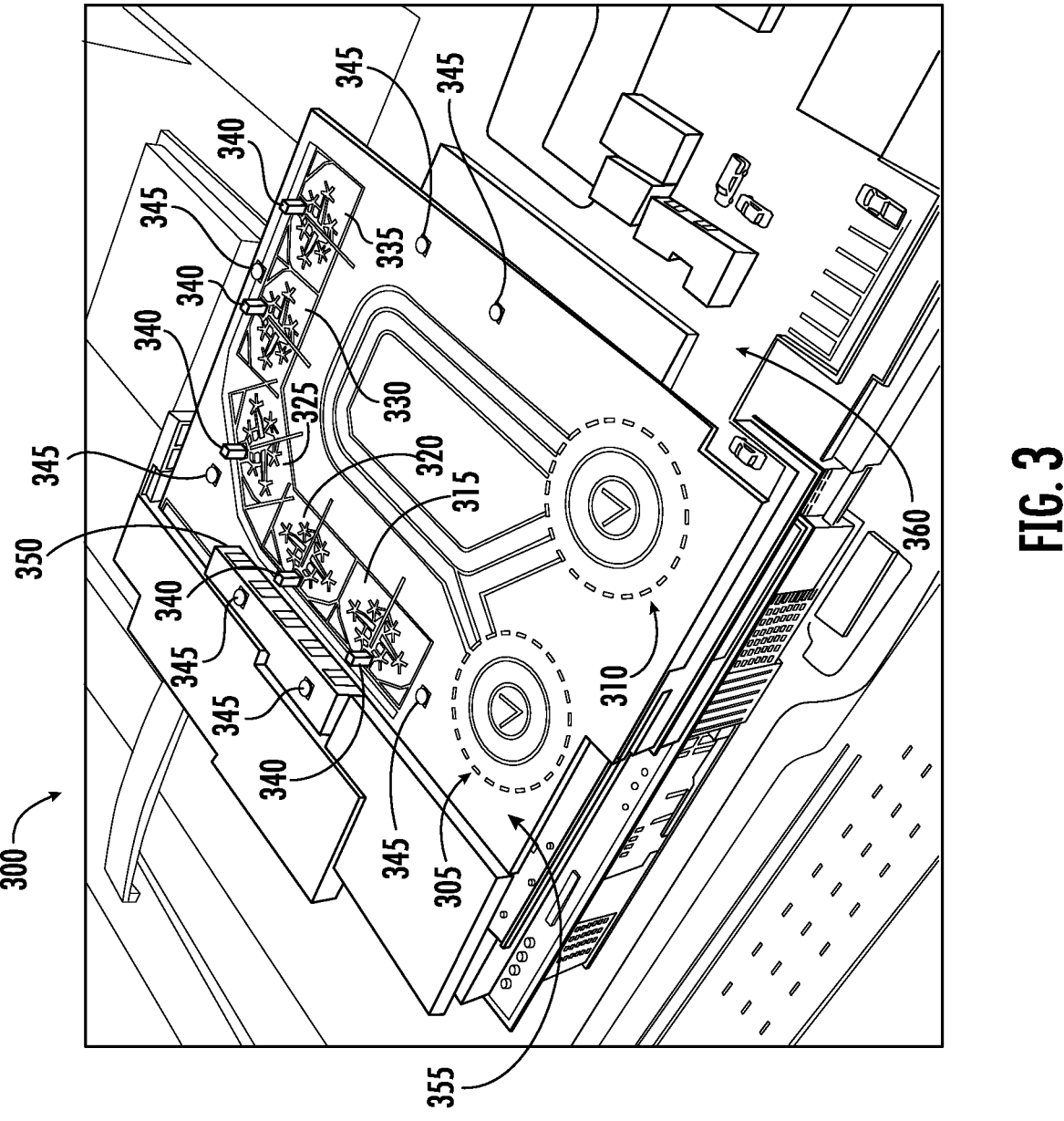
FIG. 3 depicts a graphical representation of an example aerial facility according to example embodiments of the present disclosure.

The intermediate locations within a multi-modal transportation service can be configured to help seamlessly transition users from one transportation leg or modality to another. As described herein, these intermediate locations can include aerial facilities for facilitating the take-off (e.g., departure) and landing (e.g., arrival) of aircraft utilized in a multi-modal transportation service. By way of example, FIG. 3 depicts a graphical diagram of an example aerial facility 300 according to example implementations of the present disclosure. The aerial facility 300 can include a vertiport with one or more final approach and landing pads 305, 310 (e.g., FATO pads), one or more vehicle parking locations 315-335, or other infrastructure for maintaining and facilitating the functions of aircraft (e.g., VTOLs). For example, the aerial facility 300 can include infrastructure 340 which can include hardware and software for refueling or recharging an aircraft between flights. Various portions of the infrastructure 340 can be accessible at one or more of the vehicle parking locations 315-335.

The aerial facility 300 can include a structure or area for transitioning a user to and from an aerial transportation leg of a multi-modal transportation service. The aerial facility 300 can be located in a geographic area where multi-modal transportation services are offered. For instance, the aerial facilities can include a building or designated area within a geographic environment. In some implementations, the aerial facility 300 can be a portion (e.g., a roof, dedicated floors, etc.) of a building or structure that may be used for other purposes (e.g., commercial, residential, industrial, parking, etc.).

The aerial facility 300 can include one or more sensors 345. The sensors can include visual, audio, or other types of sensors. For example, the sensors can include cameras, microphones, vibration sensors, motion sensors, RADAR sensors, LIDAR sensors, infrared sensors, temperature sensors, humidity sensors, other weather condition sensors, etc. The sensors 345 can be configured to obtain sensor data (e.g., noise data, weather data, aircraft-related data, etc.) within and around the aerial facility 300.

The aerial facility 300 can include one or more output devices. The output devices can include display screens, speakers, lighting elements, or other infrastructure to communicate information to users, facility operators, vehicle operators, or other individuals at the aerial facility 300. For example, display screens can be utilized to indicate an aircraft assigned to a user and a parking location assigned to an aircraft. The aerial facility 300 can include paths for users to travel to and/or from aircraft. In some implementations, the output devices (e.g., lighting elements) can help indicate the paths to the users.

The aerial facility 300 can include one or more access points 350 for user ingress and egress. The access points 350 can include designated areas, elevators, stairwells, etc. The access points 350 can also help users to transition between transportation legs and the different modalities associated therewith. For example, after being dropped-off at the aerial facility 300 by a ground-based vehicle for a first transportation leg, a user can utilize an access point 350 to enter an area 355 for checking-into a flight for the next transportation leg, an area for boarding an aircraft, etc. After unloading from the aircraft at the aerial facility 300, a user can utilize an access point 350 to access an area 360 for boarding a ground-based vehicle for a last transportation leg.

An aerial facility 300 can be operated by various entities. For example, a service entity that manages a fleet of aircraft and/or coordinates a transportation service can own, control, operate, etc. the aerial facility 300. In some implementations, the aerial facility 300 can be owned, controlled, operated, etc. by a third-party facility provider. The third-party facility provider may not have its own aircraft fleet but may operate the aerial facility 300 and/or permit other entities to utilize the aerial facility 300.

The aerial facility 300 can be utilized by a single entity or shared among a plurality of entities. For example, a service entity that manages/operates a fleet of aircraft can own, lease, control, operate, etc. the entire aerial facility 300. The service entity and its associated fleet may exclusively utilize the aerial facility 300, such that aircraft outside the service entity's fleet are not permitted at the aerial facility 300, except in emergency circumstances. In another example, a first service entity that manages/operates a first fleet of aircraft can share the aerial facility 300 with a second service entity that manages/operates a second fleet of aircraft. In some implementations, certain resources at the aerial facility 300 can be assigned to a particular fleet or service entity. For example, a first set of landing pads, parking pads, infrastructure, storage areas, waiting areas, etc. can be designated for the first service entity and its associated fleet. A second set of landing pads, parking pads, infrastructure, storage areas, waiting areas, etc. can be designated for the second service entity and its associated fleet. In some implementations, the resources at the aerial facility 300 can be shared such that the shared resources can be assigned dynamically, throughout an operational time period based on user/aircraft itineraries, charging needs, etc.

The aerial facility 300 can include an aerial facility computing system, not shown in FIG. 3. The aerial facility computing system can be configured to monitor and control the various resources of the aerial facility 300. This can include, for example, monitoring and controlling infrastructure such as chargers, sensors, output devices, etc. The aerial facility computing system can include one or more computing devices and can communicate with other computing systems and devices associated with the multi-modal transportation service.

Figure 4:
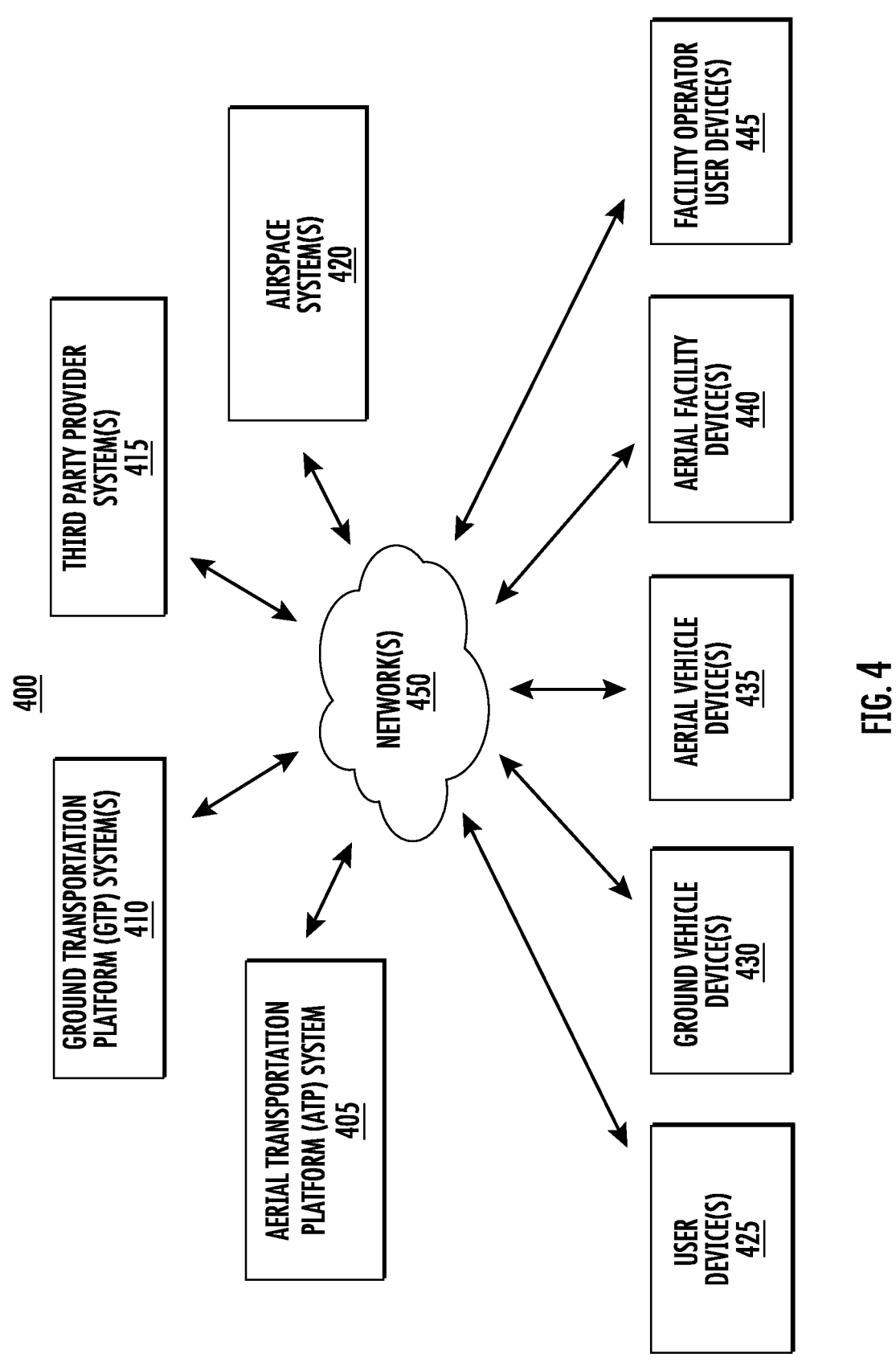
FIG. 4 depicts an example computing ecosystem for providing a multi-modal transportation service according to example implementations of the present disclosure.

FIG. 4 depicts an example computing ecosystem 400 for providing a multi-modal transportation service according to example implementations of the present disclosure. The computing ecosystem 400 includes a plurality of systems and devices that cooperate to facilitate a service across multiple modalities. The ecosystem 400 can include one or more transportation platform systems such as, for example, an aerial transportation platform (ATP) system 405 and one or more ground transportation platform (GTP) systems 410. The ecosystem 400 can include third-party provider systems 415, airspace systems 420, user devices 425, ground vehicle devices 430, aerial vehicle (e.g., aircraft) devices 435, aerial facility devices 440, and/or facility operator user devices 445. Each of the systems and/or devices can communicate over one or more wireless or wired networks 450.

The aerial transportation platform system 405 can be associated with one or more service entities that provide at least an aerial-based transportation service to users. The aerial transportation platform system 405 can include a computing platform (e.g., a cloud services platform, server system, etc.) communicatively connected over the networks 450 to one or more of the systems or devices of the computing ecosystem 400. As further described herein, the aerial transportation platform system 405 can be associated with one or more aircraft, aircraft operators, aerial facilities (or portions thereof), facility operators, etc. for facilitating the performance of at least an aerial-based transportation service. For example, the aircraft can include a fleet of aircraft (e.g., VTOLs) and the vehicle operators can include a network of aircraft operators. The network of aircraft operators can include pilots or remote operators that facilitate, oversee, or control the movement of aircraft available to perform aerial-based transportation services.

The aerial transportation platform system 405 can include one or more client-facing software applications accessible to the devices of the computing ecosystem 400. Users can interact with the aerial transportation platform system 405 to receive various types of information related to a transportation service. For example, a user (e.g., a rider) can interact with the aerial transportation platform system 405 via an instance of a software application (e.g., a rider app) running on the user device 425 to request and book a multi-modal transportation service. A facility operator can interact with the aerial transportation platform system 405 via an instance of a software application (e.g., an operations app) running on a facility operator user device 445 to view/adjust flight information, seat assignments, etc.

The ground transportation platform systems 410 can be associated with service entity(ies) that provide at least a ground-based transportation service. The ground transportation platform systems 410 can include a computing platform (e.g., a cloud services platform, server system, etc.) communicatively connected over the networks 450 to one or more of the systems or devices of the computing ecosystem 400. Each ground transportation platform system 410 can be associated with ground-based vehicles, one or more operators of ground-based vehicles, or ground infrastructure. For example, the ground-based vehicles can include a fleet of ground-based vehicles (e.g., cars) and the vehicle operators can include a network of ground vehicle operators. The network of ground vehicle operators can include drivers or remote operators that facilitate, oversee, or control the movement of ground-based vehicles available to perform ground-based transportation services. In some implementations, the ground transportation platform system 410 can be associated with ground infrastructure for facilitating the performance of a ground-based transportation service. The ground infrastructure can include one or more parking areas, vehicle transfer hubs, charging/fueling locations, storage facilities, etc.

The ground transportation platform systems 410 can include one or more client-facing software applications accessible to the devices of the computing ecosystem 400. Users can interact with the ground transportation platform systems 410 to receive various types of transportation services (e.g., delivery, ridesharing/hailing, etc.) including the multi-modal transportation services described herein. For example, the ground transportation platform system 410 can match one of its associated ground-based vehicles and/or operators with users for a ground-based transportation service.

The third-party provider systems 415 can be associated with one or more third parties that provide resources to the aerial transportation platform system 405 or the ground transportation platform system 410. For instance, the third-party provider systems 415 can be associated with a third-party aircraft provider. The third-party aircraft provider can be associated with one or more "third-party" aircraft or one or more third-party aircraft operators. Third-party aircraft/operators can be those that are outside of the dedicated fleet of "first-party" aircraft/operators of the respective transportation platform. For example, a third-party vehicle provider can decide to make its third-party aircraft/operators available to the aerial transportation platform system 405 to perform transportation services, at certain times. However, the third-party vehicle provider may maintain ownership or some level of control over third-party aircraft/operators.

Additionally, or alternatively, the third-party provider systems 415 can be associated with a third-party facility provider. The third-party facility provider can provide facilities (or facility resources) for use in performing transportation services. For example, the third-party facility provider can own, operate, etc. one or more aerial facilities (or portions thereof) that can be rented, leased, or otherwise utilized by a transportation platform system for providing an aerial transportation service.

The aerial transportation platform system 405 or the ground transportation platform system 410 can interact with the third-party provider systems 415 to leverage the capabilities of the third-party aircraft, operators, or infrastructure. In some implementations, the aerial transportation platform system 405 or the ground transportation platform system 410 can communicate directly or indirectly (e.g., through the third-party provider systems 415) with the third-party aircraft, operators, or infrastructure.

In some implementations, a multi-modal transportation service can be scheduled and/or facilitated based on information provided by the airspace systems 420. The airspace systems 420 can include one or more airspace data exchanges or otherwise be associated with regulatory bodies configured to collect real-time, historical, or regulatory airspace data. The airspace data can include information regarding the weather, air-traffic, or regulatory approval for flight operations in an airspace. The airspace systems 420 can include, for example: (i) aggregating systems that pool airspace data associated with an airspace; (ii) third-party monitoring systems configured to monitor aspects of an airspace (e.g., noise, etc.); and/or (iii) regulatory systems that can confirm, validate, or approve an aerial-based transportation service before take-off based on one or more policies or standards set by a regulatory body (e.g., Federal Aviation Administration, European Aviation Safety Agency, etc.).

The user devices 425 can include computing devices owned and/or otherwise accessible to a user of a transportation service. For example, a user device 425 can include a hand-held computing device (e.g., a phone, a tablet, etc.), a wearable computing device (e.g., smart watch, smart glasses, etc.), personal desktop devices, or other devices. The user devices 425 can execute one or more instructions to run an instance of a software application for a respective transportation platform and present user interfaces associated therewith.

The ground vehicle devices 430 can include computing devices or systems associated with a ground-based vehicle or operator. For example, the ground vehicle devices 430 can include one or more vehicle computing systems such as, for example, an onboard computer for operating the vehicle, an autonomy system, an infotainment system, etc. Additionally, or alternatively, the ground vehicle devices 430 can include an operator's user device (e.g., a driver's mobile phone, etc.). In some implementations, the ground vehicle devices 430 can include a user device that remains onboard the ground-based vehicle such as, for example, a tablet that is available to a passenger or operator.

The aerial vehicle devices 435 can include one or more aircraft computing systems and/or aircraft operator user devices. For instance, the aerial vehicle devices 435 can include a computing system onboard an aircraft such as a pilot interface, an avionics system, an infotainment system, a navigation system, an autonomy system, or any other sensors or devices located on an aircraft and capable of sending and/or receiving information. Additionally, or alternatively, the aerial vehicle devices 435 can include an aircraft operator's user device (e.g., a pilot's mobile phone). In some implementations, the aerial vehicle devices 435 can include a user device that remains onboard the aircraft such as, for example, a tablet or display that is available to a passenger or operator.

Aerial facilities used for providing a transportation service can include one or more aerial facility devices 440 and/or one or more facility operators. The aerial facility devices 440 can be positioned at various locations within and/or around the aerial facility to collect and receive information associated with an aerial transportation service. The aerial facility devices 440 can include one or more charging devices associated with charging infrastructure of the aerial facility, one or more vehicle positioning devices (e.g., motorized tugs, etc.), one or more sensors or surveillance devices (e.g., noise sensors, cameras, etc.), etc.

The facility operators can be associated with an aerial facility to assist users with security checks, check-ins, boarding/de-boarding, performing aircraft checks, etc. The facility operator user devices 445 can include user devices utilized by the facility operators. The facility operator user devices 445 can be used to communicate with a transportation platform or perform various functions at an aerial facility. For example, the facility operator user devices 445 can run one or more software applications to complete security checks, check in/out luggage, coordinate re-charging/re-fueling, present safety briefings, or the like.

As discussed herein, the aerial transportation platform system 405 and the ground transportation platform system 410 can plan and fulfill multi-modal transportation services. The orchestration of a multi-modal transportation service can be performed in a number of different implementations. For example, in a single orchestrator implementation, a transportation platform system can receive a request and orchestrate the multi-modal transportation service. In a multi-orchestrator implementation, a combination of transportation platforms can collaborate to orchestrate the multi-modal transportation service.

Figure 5:
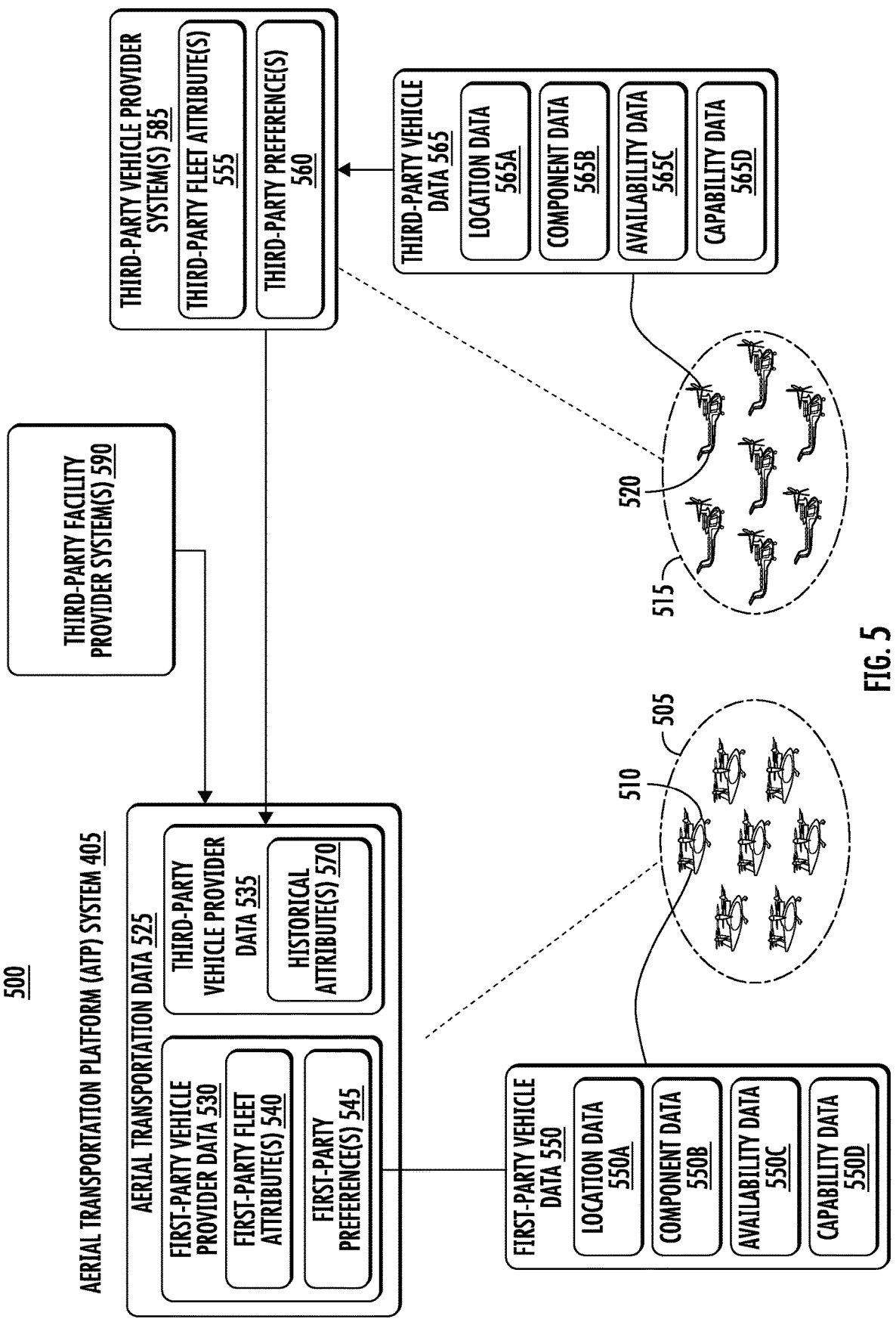
FIG. 5 depicts an example vehicle provider ecosystem according to example implementations of the present disclosure.

FIG. 5 depicts an example aerial transportation ecosystem 500 according to example embodiments of the present disclosure. The aerial transportation ecosystem 500 includes the aerial transportation platform system 405, one or more third-party facility provider systems 590, and one or more third-party vehicle provider systems 585.

The aerial transportation platform system 405 can be associated with a first-party aircraft fleet 505. The first-party aircraft fleet 505 can include a plurality of first-party aircraft 510 owned, maintained, operated, or otherwise affiliated with the aerial transportation platform system 405.

The one or more third-party vehicle provider systems 585 can be associated with a third-party aircraft fleet 515. The third-party aircraft fleet 515 can include a plurality of third-party aircraft 520 owned, maintained, operated, or otherwise affiliated with the third-party aircraft fleet 515.

The aerial transportation platform system 405 can communicate with the first-party aircraft 510 or the third-party vehicle provider systems 585 to access at least a portion of the aerial transportation data 525. The portion of aerial transportation data 525, for example, can include first-party vehicle provider data 530 and third-party vehicle provider data 535.

The first-party vehicle provider data 530 can include one or more first-party fleet attributes 540, one or more first-party preferences 545, or first-party vehicle data 550.

The first-party fleet attributes 540 can identify one or more types of aircraft or any other attributes associated with the aircraft within the first-party aircraft fleet 505. By way of example, the first-party aircraft fleet 505 can include one or a plurality of different types of aircraft. Each different type of aircraft can be associated with one or more different aircraft attributes. For example, aircraft of a certain vehicle type can be associated with one or more common aircraft attributes. By way of example, a vehicle type can include a large vehicle type with a high payload capacity at the expense of speed, a small vehicle type with a low payload capacity and high speed, a luxury vehicle, a high-speed vehicle, etc. In some implementations, the first-party fleet attributes 540 can identify one or more overhead costs (e.g., fixed costs, etc.) for maintaining the first-party aircraft fleet 505 or one or more opportunity costs afforded by the first-party aircraft fleet 505.

The first-party preferences 545 can indicate one or more preferences of the aerial transportation platform system 405 for the performance of an aerial transportation service. The first-party preferences 545, for example, can identify an operational time period, service type (e.g., delivery, ride-share, etc.), weather conditions, geographic locations, aerial facilities, or any other attribute of a transportation service that can assist the aerial transportation platform system in scheduling first-party aircraft 510 for facilitating the transportation service. As one example, an operational time period can identify a time during which the aerial transportation platform system 405 prefers to use the first-party aircraft 510 to perform a transportation service. In some implementations, the first-party preferences 545 can identify attributes of a transportation service such as longer flight times, shorter flight times, types of vehicle maintenance (e.g., charging times, etc.), or any other aspect of a transportation service.

The first-party vehicle data 550 can be indicative of one or more aircraft attributes associated with each of the first-party aircraft 510 of the first-party aircraft fleet 505. By way of example, the aircraft attributes can include location data 550A, component data 550B, availability data 550C, or capability data 550D for each of the first-party aircraft 510 of the first-party aircraft fleet 505. The aerial transportation platform system 405 can communicate with the first-party aircraft 510 to access the first-party vehicle data 550.

The location data 550A, for example, can identify a current, predicted, or historical location of the first-party aircraft 510. The location data 550A can be determined through one or more messages exchanged between the aerial transportation platform system 405 and the first-party aircraft 510. For instance, the location data 550A can be determined based on sensor data (e.g., GPS data, RADAR data, etc.) from one or more sensors onboard the first-party aircraft 510. As another example, the location data 550A can be determined based on one or more flight plans assigned to the first-party aircraft 510, etc.

The component data 550B can identify the types of components of the first-party aircraft. A component can include, for example, one or more hardware or software components for each of the plurality of first-party aircraft 510. The hardware components can include at least one power component (e.g., an engine, fuel tank, battery, etc.), climate control component, navigation component, flight control component, etc. The one or more software components can include one or more software applications (e.g., an operating system, a user interface, etc.) associated with each of the plurality of first-party aircraft 510.

The component data 550B can identify a current, predicted, or historical state for each aerial component of the first-party aircraft 510. The state can identify a health, power level, current software version, etc. of each of the one or more components. As one example, a current state of a power component can identify a current power level or range for each of the first-party aircraft 510. In some implementations, the current power level or range can include a dynamic variable that depends on characteristics associated with candidate flight plans.

In some implementations, the first-party aircraft 510 can include electric aircraft powered by one or more batteries. The component data 550B for an electric aircraft can include battery data indicative of a current, historical, or predicted condition of the one or more batteries. The battery data, for instance, can be indicative of a plurality of battery characteristics for the batteries. The battery characteristics can identify operating conditions of the batteries as well as a battery configuration.

Battery operating conditions can be indicative of a maximum capacity of the batteries at a particular time. The maximum capacity of the batteries can be based on a battery type, configuration, etc. of the batteries onboard the first-party aircraft 510. The maximum capacity can change over time based on a number of dynamic battery characteristics including, for example, a battery's age, usage history, or any other characteristic associated with the battery's capacity to hold power. For example, the maximum capacity of the batteries onboard the first-party aircraft 510 can decrease over time as the batteries age or degrade.

The battery operating conditions can also be indicative of a current state of charge or a future, predicted state of charge of the batteries onboard the first-party aircraft 510. The state of charge of the batteries can indicate a level of power accessible to the first-party aircraft 510 at a particular time. The state of charge can be based on a level of charge or a temperature of the batteries. The level of charge can be a function of and depend on the maximum capacity of the batteries. For instance, the level of charge can identify a percentage of the maximum capacity that is available to the first-party aircraft 510 at a particular time.

The battery operating conditions can be based on a battery model for a battery of an electric aircraft. The battery model can include one or more charging parameters (e.g., types of charges (e.g., slow, fast, etc.), infrastructure necessary to service the battery (standardized charging interfaces, etc.), and a range model configured to determine a range for a respective battery based on the battery's state of charge or any other factor that may affect the performance of the battery.

The availability data 550C can identify a current, predicted, or historical assignment (e.g., a service assignment, a maintenance assignment, etc.) for the first-party aircraft 510. For example, the availability data 550C can be indicative of usage information (e.g., historical usage, current usage, expected usage, etc.) for the first-party aircraft 510. The usage data can be indicative of historical, current, or expected flights, maintenance, or any other tasks associated with a respective aircraft.

The capability data 550D can be associated with one or more constraints or capabilities of a respective first-party aircraft 510. For example, the capability data 550D can include at least one of a payload capacity (e.g., maximum allowable payload, weight, etc.), a seating capacity (e.g., a maximum number of passengers per flight), a performance history (e.g., historic performance on trips for the service entity or other service providers), one or more vehicle control parameters (e.g., operational capabilities such as turning radius, lift, thrust, or drag capabilities), one or more speed parameters (e.g., maximum, minimum, or average speed, etc.), or one or more maintenance requirements (e.g., infrastructure required to perform maintenance, refueling, etc. for the aircraft, etc.).

In some implementations, the capability data 550D can be indicative of operator capabilities associated with an operator of the first-party aircraft 510 (e.g., a pilot rank, designated operating areas, seniority, rating, etc.).

The capability data 550D can dynamically change based on the component data 550B or other real-time information such as weather conditions, etc. This information can be monitored (e.g., by an onboard system or offboard system) and updated in real-time to maintain a database that accurately reflects the aircraft.

The aerial transportation platform system 405 can communicate with the third-party vehicle provider systems 585 to access the third-party vehicle provider data 535. The third-party vehicle provider data 535 can include third-party fleet attributes 555, third-party preferences 560, or third-party vehicle data 565. The third-party fleet attributes 555, the third-party preferences 560, or the third-party vehicle data 565 can include similar types of information for the third-party aircraft 520 as any of the example first-party fleet attributes 540, first-party preferences 545, or first-party vehicle data 550 described herein. By way of example, the third-party vehicle data 565 can include location data 565A, component data 565B, availability data 565C, or capability data 565D as described with reference to the location data 550A, component data 550B, availability data 550C, and capability data 550D of the first-party vehicle data 550. The third-party vehicle provider systems 585 can communicate with the third-party aircraft 520 to access the third-party vehicle data 565.

In some implementations, the third-party vehicle provider data 535 can include third-party historical attributes 570. The third-party historical attributes 570 can be indicative of one or more historical interactions between the third-party vehicle provider systems 585 and the aerial transportation platform system 405. For example, the third-party historical attributes 570 can be indicative of one or more previous aerial transportation services provided by the third-party aircraft 520. The third-party historical attributes 570 can be indicative of a reliability, a willingness to perform various types of aerial transportation services, service time constraints met or exceeded, user reviews, etc. of the third-party vehicle provider systems 585.

As described herein, a computing system can leverage the aerial transportation data 525 to plan and facilitate a plurality of flights. The plurality of flights can be performed using electric aircraft powered by a plurality of batteries. The operation of such aircraft can depend on the state of the charge for the batteries.

Figure 6A:
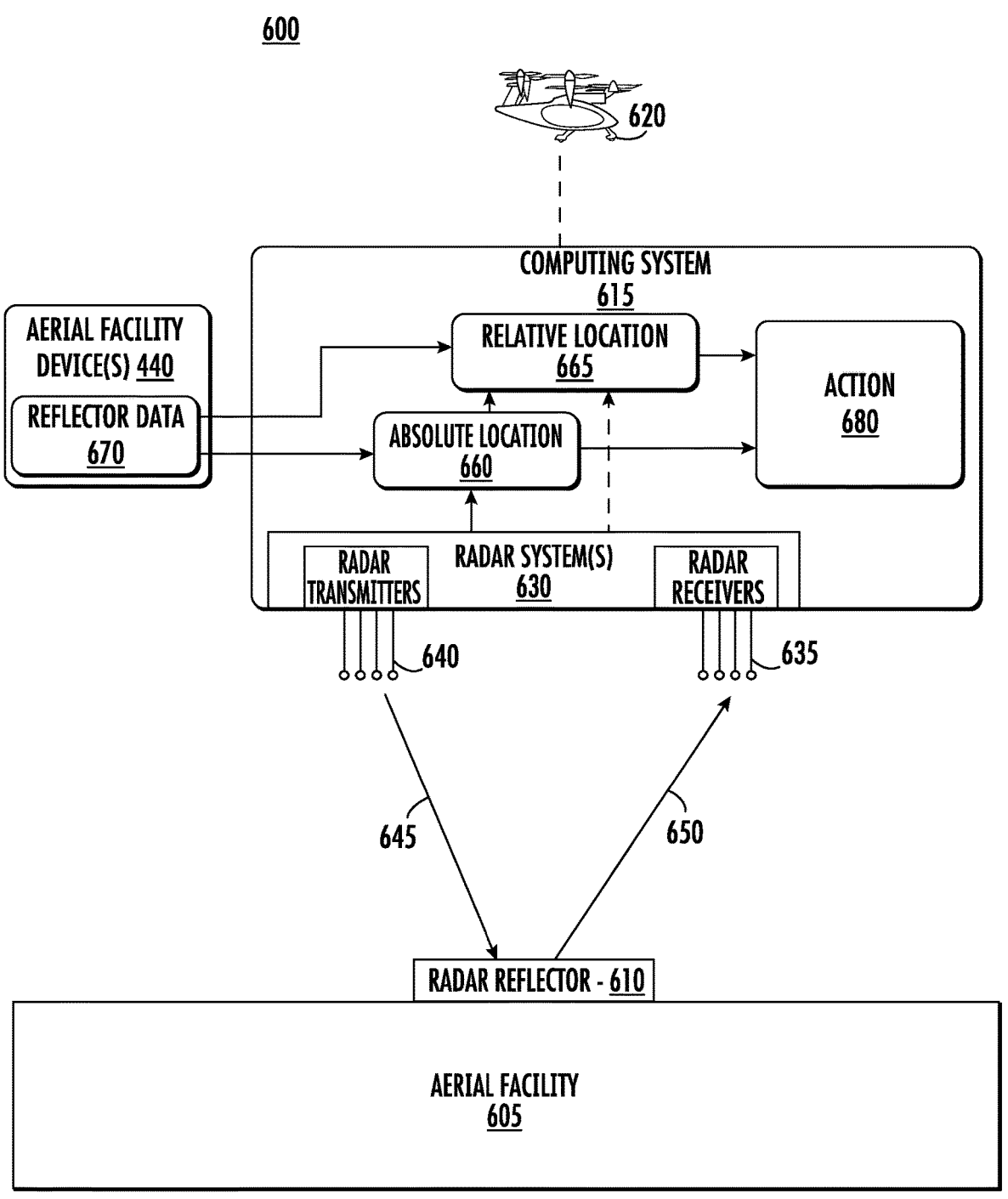
FIG. 6A depicts an example aerial facility with radar reflectors according to example embodiments of the present disclosure.

FIG. 6A depicts an example system 600 according to example implementations of the present disclosure. System 600 facilitates interaction at an aerial facility 605 with radar reflectors 610. A computing system 615 can be associated with an aircraft 620 and configured for interfacing with the radar reflectors 610 and/or one or more aerial facility devices 440 associated with the aerial facility 605. The aerial facility 605 can correspond to aerial facility 300 of FIG. 3. Computing system 615 can include an aerial vehicle device 435 of FIG. 400.

Aircraft 620 can be a VTOL aircraft that can perform a vertical lift and hover maneuver (e.g., to take-off and land) as well as perform a forward cruise maneuver. This can be accomplished by a moveable propulsion system such as, for example, rotor assemblies that tilt/rotate to cause a lift force in one position and a thrust force in another position.

More specifically, the computing system 615 can include an aerial computing system onboard a VTOL aircraft. The computing system 615 can include one or more radar systems 630. Each radar system 630 can include a plurality of radar receiving antennas 635 and a plurality of radar transmitter antennas 640. The radar transmitter antennas 640 can transmit radio signals that can be reflected from objects within the aircraft's surrounding environment back to the radar receiving antennas 635. The radar transmitter antennas 635 and/or radar receiving antennas 640 can be configured for omnidirectional signal propagation. For instance, one or more of the radar transmitter antennas 635 and/or radar receiving antennas 640 can be a horizontal antenna (e.g., for azimuth propagation), while one or more other radar transmitter antennas 635 and/or radar receiving antennas 640 can be a vertical antenna (e.g., for elevation propagation). In other implementations than illustrated in FIG. 6A, each radar system 630 can include a plurality of transceiver antennas that are configured to both transmit and receive radio signals.

The computing system 615 can transmit radar signals from the radar systems 630 as the aircraft 620 performs a flight from an origin aerial facility to a destination aerial facility. During the flight, the radar signals can be reflected or transmitted back by one or more radar reflectors 610 strategically placed along a route between the origin aerial facility to the destination aerial facility ("en-route reflectors").

The radar signals reflected or transmitted by the en-route radar reflectors 610 can be received by the computing system 615 and processed to estimate a position of aircraft 620 along the route. The computing system 615 can process the radar signals by identifying a predefined location of a respective radar reflector 610. The computing system 615 can subsequently compute a distance and/or angle between the aircraft 620 and the respective radar reflector 610 based on the predefined location. The computing system 615 can further compute a range of locations at which the aircraft 620 may be located based on the predefined location of the respective radar reflector 610 and the distance and/or angle between the aircraft 620 and the respective radar reflector 610. In this manner, radar signals received from the en-route radar reflectors 610 can be used to bound the location of aircraft 620.

The computing system 615 can also transmit radar signals 645 from the radar systems 630 as the aircraft 620 approaches or navigates within/above the destination aerial facility at which the aircraft 620 may land. In response to the radar signals 645, the computing system 615 can receive, using the plurality of radio receivers onboard the aircraft, reflected radio data 650. The reflected radio data 650 can include a plurality of radio signals reflected or transmitted from a plurality of radar reflectors 610 placed at a plurality of locations of the destination aerial facility. Unless otherwise specified, reflected radio data 650 received back at the radar system 630 by the one or more radar receiving antennas 635 is intended to included radio signals that are reflected without substantive signal change as well as radio signals that are reflected back with one or more forms of signal modulation (e.g., changes in amplitude, frequency, phase, polarization, etc.)

The plurality of radar reflectors 610 can include a subset of a superset of radar reflectors located on the aerial facility 605. The subset of radar reflectors can include those that are within a field of view of the computing system 615 (e.g., the plurality of radio transmitters and receivers thereof). For example, the superset of radar reflectors can include directional and/or omnidirectional radar reflectors placed at various locations of the aerial facility 605. A different subset of radar reflectors can be within the computing system's field of view based on the aircraft's position relative to the aerial facility due to obstructions on or within a proximity of the aerial facility, a reflecting direction of directional reflectors, etc.

The radar reflectors 610 can include any combination of active or passive radar reflectors. The radar reflectors 610 can include reflective surfaces such as aluminum or any other surface with desirable reflective properties. The reflective surface can be configured at one or more angles such that radar signals can be reflected in a different angle/direction than the angle/direction at which the radar signal is received. The directional reflectors can include reflective surfaces that reflect signals in one or more specified directions. The omnidirectional reflectors can include reflective surfaces that reflect signals in multiple directions.

In some implementations, the radar reflectors 610 can include active radar reflectors. The active radar reflectors can be composed of one or more antennas (e.g., 1, 2, 4, 8 antennas) and a microwave frequency amplification chain. The signal picked up by the radar receiving antenna 635 can be amplified and retransmitted to a level corresponding to the desired radar cross-section. In this manner, active radar reflectors can extend the range at which an aircraft can use radar returns from the radar reflectors.

In some aspects, the active radar reflectors can include one or more modulation circuit components (e.g., a mixer, switches, amplifiers, and/or other non-linear elements) that can modulate radar returns. The radar returns can be modulated according to one or more modulation schemes that include but are not limited to modulation techniques such as changing the amplitude, polarization, frequency and/or phase of the radio signals. The modulation schemes can include one common modulation scheme, multiple reflector specific modulation schemes, or landing pad specific modulation schemes.

For example, the modulation schemes can include one common modulation scheme implemented by each radar reflector of an aerial facility. The computing system 615 can analyze the received radar data to ensure that the received radar signals correspond to the common modulation scheme. Radar signals that do not correspond to the common modulation scheme can be ignored, reported as malicious, etc.

As another example, the modulation schemes can include a plurality of modulation schemes that specifically identify each radar reflector.

As yet another example, the modulation schemes can include a plurality of modulation schemes that respectively identify an area of the aerial facility 605 such as, for example, a landing pad. By way of example, the modulation schemes can include a different modulation scheme for each landing pad of an aerial facility 605. Each respective landing pad can be associated with one or more radar reflectors 610 that are configured to transmit radar signals according to a respective modulation scheme. The computing system 615 can analyze the received radar data to identify a respective landing pad based on the modulation scheme associated with the received radar data. These operations can advantageously help to identify and initiate a maneuver action relative to a particular landing pad among multiple landing pads at an aerial facility 605.

In some implementations, the radar reflectors 610 can be associated with a radar signature that respectively identifies each radar reflector 610. The radar signature can be based on the reflective surface of a respective radar reflector 610, a modulation scheme associated with the radar reflector 610, or any other unique characteristic that may be associated with radar signals reflected or transmitted from a respective radar reflector 610. The radar signatures for each radar reflector 610 can be computed based on historical observations of the radar reflectors or can be determined from a database of known values for the radar signatures (e.g., a database stored in the computing system 615 or aerial facility device 440).

Referring now to FIG. 6B, an overhead view of an example aerial facility 605 depicts arrangements of radar reflectors according to example embodiments of the present disclosure. The radar reflectors 610 of FIG. 6A can be strategically placed at a plurality of locations 686, 688, 690, 692 of an aerial facility 605 to help aircraft 620 navigate within a proximity of the aerial facility 605. The plurality of locations can include multiple location arrangements 685, 687, 689, 691. A respective location arrangement can correspond to a constellation of radar reflectors 610 including a radar reflector placed at each of the locations of the respective location arrangement. For example, location arrangement 685 can correspond to a constellation of radar reflectors 610 respectively placed at the locations 686 of location arrangement 685. Location arrangement 687 can correspond to a constellation of radar reflectors 610 respectively placed at the locations 688 of location arrangement 687. Location arrangement 689 can correspond to a constellation of radar reflectors 610 respectively placed at locations 690 of location arrangement 689. Location arrangement 691 can correspond to a constellation of radar reflectors 610 respectively placed at locations 692 of location arrangement 691.

The location arrangements of FIG. 6B can include one or more first location arrangements 685, 687 and one or more second location arrangements 689, 691. The first location arrangements 685, 687 can respectively correspond to landing pads 305, 310 of the aerial facility 605. The second location arrangements 689, 691 can respectively correspond to predefined approach paths 694, 696 to respective landing pads 305, 310 of the aerial facility 605. Although the landing pads 305, 310 are depicted in FIG. 6B as substantially circular in shape, it should be appreciated that landing pads can alternatively comprise a substantially square shape, a substantially rectangular shape, an elliptical shape, or other symmetrical or asymmetrical polygonal shape.

For example, the plurality of locations at which the radar reflectors 610 are placed can include a first arrangement 685 of locations 686 that are proximate to a particular landing pad 305. A first set of the plurality of radar reflectors 610 can be placed at the first arrangement 685 of locations 686. In some implementations, the first set of the plurality of radar reflectors 610 corresponding to first arrangement 685 can include omni-directional passive radar reflectors. As one example, the plurality of radar reflectors 610 corresponding to first arrangement 685 can include at least three radar reflectors 610 and the plurality of locations 686 at which the three radar reflectors 610 are placed can include a first location arrangement that includes a respective location for each radar reflector 610 that is proximate to the particular landing pad 305.

The first arrangement 685 of locations 686 that are proximate to the particular landing pad 305 as well as the first arrangement 687 of locations 686 that are proximate to the particular landing pad 310 can be associated with an identifiable pattern (e.g., a triangle, star, square, pentagon, hexagon, or any other polygon or pattern). In some implementations, the pattern can include an asymmetrical pattern to help the computing system 615 determine a direction at which aircraft 620 is approaching the particular landing pads 305, 310. In some implementations, the pattern of locations 686 can be the same as the pattern of locations 688, but different modulation schemes can be used to distinguish among corresponding radar reflectors of landing pad 305 and landing pad 310. In some implementations, the pattern of locations 686 can be different than the pattern of locations 688 and this difference can be used in full or in part to distinguish among corresponding radar reflectors of arrangement 685 proximate to landing pad 305 and radar reflectors of arrangement 687 proximate to landing pad 310.

First location arrangements 685, 687 can be configured based on landing pad positioning criteria. The landing pad positioning criteria can account for the geometry of particular landing pads 305, 310, a surrounding environment of the aerial facility 605, or the facility layout of the aerial facility 605. The landing pad positioning criteria can be used to increase the signal to noise ratio of the radar reflectors placed at each position of the first location arrangements 685, 687.

As an example, the first location arrangement 685 can be configured based on the geometry of the particular landing pad 305. For instance, the first location arrangement 685 can include a plurality of locations 686 placed at an outer circumference 681 of a generally circular landing pad 305 such that the center of the landing pad 305 remains clear. By way of example, the first location arrangement 685 can be configured based on a threshold distance from the center 682 of the particular landing pad 305 such that each location 686 of the first location arrangement 685 can be at least the threshold distance from the center 682 of the particular landing pad 305. In some implementations, the first location arrangement 685 can be configured based on an inner threshold distance 683 that defines a particular distance from the center 682 of the particular landing pad 305 and an outer threshold distance 684 that defines a longer particular distance from the center 682 of the particular landing pad 305 such that each location 686 of the first location arrangement 685 is within an area 695 defined by the inner threshold distance 683 and the outer threshold distances 684.

In some implementations, the first location arrangement 685 can be configured based on a threshold distance between each respective location 686 of the first arrangement of locations. For example, the threshold distance can define a particular distance at which radar reflectors 610 should be placed from each other to limit radio interference and/or radar resolution by ensuring a minimum separation between radar reflectors 610 to distinguish individual reflectors from one another. In this manner, the first location arrangement 685 can include a plurality of locations 686 that are a threshold distance from one another to decrease radio interference.

As another example, the first location arrangements 685, 687 can be configured based on a surrounding environment of the aerial facility 605. For instance, the first location arrangements 685, 687 can be configured to limit radio interference and/or multi-path signal propagation caused by adjacent structures (e.g., building, towers, etc.), environmental conditions, etc.

As yet another example, the first location arrangements 685, 687 can be configured based on a facility layout of the aerial facility 605. For instance, the first location arrangement 685 can be configured to limit radio interference caused by structures of the aerial facility, other landing pads (e.g., landing pad 310) of the aerial facility, etc.

The plurality of locations of the aerial facility 605 at which the radar reflectors 610 are placed can include one or more second arrangements 689, 691 of locations 690, 692 that are associated with approach paths 694, 696 to the particular landing pads 305, 310. A second set of the plurality of radar reflectors 610 can be placed at the one or more second arrangements 689, 691 of locations 690, 692. In some implementations, the second set of the plurality of radar reflectors can include directional radar reflectors such that radar signals are only reflected in a direction along to the approach paths 694, 696. Although arrangements 689, 691 are illustrated as adjacent to landing pads 305, 310, it should be appreciated that the arrangements could be farther away from the landing pads 305, 310 in a manner that advantageously helps to guide nearby aircraft to landing pads 305, 310.

Returning to FIG. 6A, the computing system 615 can determine an absolute location 660 of aircraft 620 based on radio data 650 received while the aircraft 620 approaches or navigates within/above the aerial facility 605. For instance, the absolute location 660 can include a geographical location defined in terms of latitude and longitude. In some implementations, the geographical location can include three-dimensional coordinates defined in terms of latitude, longitude, and altitude. In addition, or alternatively, the absolute location 660 can include a relative location defined by a local, aerial facility specific coordinate system.

The computing system 615 can determine the absolute location 660 of the aircraft 620 based on the subset of radar reflectors 610 that are within the field of view of the radar system 630 onboard the aircraft 620. For instance, the computing system 615 can determine a range of candidate locations based on a quantity of radar reflectors within the field of view, a type of radar reflectors within the field of view, etc. The range of candidate locations, for example, can include a plurality of locations relative to the aerial facility 605 at which a respective quantity of radar reflectors, type of radar reflectors, etc. are within a field of view of the computing system 615.

In some implementations, directional radar reflectors can be used to help determine the location of an aircraft 620 based on the subset of reflectors that are within the field of view of the radar system 630 onboard the aircraft 620.

In some implementations, the computing system 615 can identify a particular radar reflector 610 based on a particular switching frequency or modulation scheme of the radio data 650. By way of example, each of the plurality of radar reflectors 610 can be configured to implement the particular switching frequency or modulation scheme. The computing system 615 can analyze the radio data 650 to identify the particular switching frequency or modulation scheme to identify the particular radar reflector 610. The computing system 615 can determine the absolute location 660 of the aircraft 620 based on the particular radar reflector 610 identified based on the particular switching frequency or modulation scheme.

In addition, or alternatively, the computing system 615 can compute the absolute location 660 for the aircraft 620 based on the radio data 650 and the plurality of locations of the aerial facility at which the radar reflectors are placed. To do so, the computing system 615 can access a reflector lookup table. The reflector lookup table can be hosted by an aerial facility device 440, by computing system 615 onboard aircraft 620, or another remote location otherwise accessed by computing system 615. The reflector lookup table can include reflector data 670 for the superset of radar reflectors located on the aerial facility 605. The reflector data 670, for example, can be indicative of a particular location of a particular reflector on the aerial facility 605. The particular location can include geographical or local coordinates for the particular reflector. By way of example, the particular location can include geographical coordinates defined in a three-dimensional coordinate system (e.g., a coordinate system defined by a latitudinal dimension, a longitudinal dimension, and an elevation/altitude dimension. As another example, the particular location can include relative coordinates defined in a local coordinate frame associated with the aerial facility. The computing system 615 can access the reflector data 670 to identify the plurality of locations of the aerial facility 605 at which the plurality of radar reflectors 610 are placed.

In some implementations, a particular location for a particular radar reflector 610 can be identified from the reflector lookup table using a radar signature. By way of example, the reflector lookup table can include a plurality of reflector location entries indexed by a plurality of different radar signatures respectively associated with each of the superset of radar reflectors located on the aerial facility 605. In some implementations, the reflector location entries can be indexed by a reflector hash that can be computed using the plurality of different radar signatures. For instance, the lookup table can include a hash table that is indexed using hashes that can be derived from data indicative of the plurality of different radar signatures.

The computing system 615 can analyze the reflected radio data 650 to identify a plurality of radar signatures associated with the reflected radio data 650. By way of example, the plurality of radar signatures can be identified based on the timing or characteristics (e.g., amplitude, frequency, phase, etc.) of the received radar signals.

The computing system can identify a reflector signature that corresponds to a particular radar reflector 610 from the radio data 650. The computing system 615 can identify a particular location for the particular radar reflector 610 on the aerial facility 605 by searching the reflector lookup table using the radar signature.

In some implementations, the computing system 615 can compute a reflector hash for the reflector signature. For instance, the computing system 615 can apply a hash function to data indicative of the reflector signature to compute a reflector hash. The computing system 615 can identify, using the reflector hash for the reflector signature, the particular location of the particular reflector on the aerial facility 605 from the reflector lookup table.

The computing system 615 can compute a location for the aircraft 620. The location can include an absolute location 660 and/or a relative location 665. In some aspects, computing system 615 can compute the absolute location 660 for the aircraft 620 based on the plurality of locations of the radar reflectors 610 within the computing system's field of view. For example, the computing system 615 can compute one or more location parameters (e.g., a distance/or and an angle (azimuth/elevation)) between the aircraft 620 and one or more of the radar reflectors 610. The distance and/or the angle can be computed based on a time-of-flight computation for the received radio data 650. For instance, the distance and/or the angle can be computed based on a time of flight between the transmission of a radar signal 645 by the computing system 615 and the reception of radio data 650 indicative of a reflected radar signal at the computing system 615.

The computing system 615 can compute the absolute location 660 for the aircraft 620 based on the particular location of the particular radar reflector 610 on the aerial facility 605 and the distance between the aircraft 620 and the particular radar reflector 610. For instance, the computing system 615 can triangulate the position of the aircraft 620 based the particular location of and distance from each of the radar reflectors 610 that are within the computing system's field of view.

In some implementations, the computing system 615 can compute the aircraft's relative location 665 with respect to one or more areas of the aerial facility 605. To do so, the computing system 615 can access facility layout data indicative of a location of one or more areas of the aerial facility 605. By way of example, the facility layout data can be indicative of a location of one or more landing pads, one or more pedestrian walkways, one or more approach paths, one or more parking areas, one or more maintenance areas, or the location of any other portion of the aerial facility. As one particular example, the facility layout data can be indicative of a location of the particular landing pad at which the aircraft 620 is scheduled to land.

The locations of the one or more areas of the aerial facility 605 can be defined in a geographical coordinate system or a local coordinate system specific to the aerial facility 605. For example, a location of a landing pad (e.g., landing pads 305, 310 of FIGS. 3 and 6B) or other area of aerial facility 605 can be defined in terms of a of latitude, longitude, and altitude value or other identifiers suitable for identifying geographical position. A local coordinate system could additionally or alternatively be used to define a location of a landing pad (e.g., landing pads 305. 310 of FIGS. 3 and 6B) or other area of aerial facility 605. For example, a local coordinate system for aerial facility 605 could be defined relative to a 2D or 3D grid of positions defined by at least a first dimension and second dimension as well as an optional third dimension of aerial facility 605.

The computing system 615 can compute a relative location 665 of the aircraft 620 with respect to a particular landing pad based on the absolute location 660 of the aircraft 620 and the location of the particular landing pad. For example, the absolute location 660 of the aircraft 620 and the location of the particular landing pad can be defined in the same coordinate system such that the relative location 665 of the aircraft 620 with respect to the particular landing pad can be identifiable from the absolute location 660 of the aircraft 620 and the location of the particular landing pad.

In addition, or alternatively, the absolute location 660 of the aircraft 620 and the location of the particular landing pad can be defined in different coordinate systems. In such a case, the computing system 615 can transform the absolute location 660 of the aircraft 620 and the location of the particular landing pad to a common coordinate frame to compute the relative location 665 of the aircraft 620 with respect to the particular landing pad.

The relative location 665 of the aircraft 620 with respect to the particular landing pad can include a distance between the aircraft 620 and the particular landing pad. In addition, or alternatively, the relative location 665 of the aircraft 620 with respect to the particular landing pad can include an angle or direction of travel to reach the particular landing pad. In some implementations, the relative location 665 of the aircraft 620 with respect to the particular landing pad can include a confirmation that the aircraft 620 is within a threshold distance of the particular landing pad. The threshold distance, for example, can be indicative of a landing radius within which the aircraft 620 can land at the particular landing pad.

In some implementations, the computing system 615 can identify the particular landing pad based on the radio data 650. For example, the particular landing pad can be associated with particular combination of radio data received by radar system 630. By way of example, a plurality of radar reflectors placed within a proximity of the particular landing pad can implement a specific pattern of switching frequencies or modulation schemes. Different patterns of radar reflectors with different switching frequencies can allow for landing pad identification. For example, five radar reflectors installed at a first landing pad can respectively operate at switching frequencies f1, f2, f3, f4, and f5, while a second landing pad can have five reflectors respectively operating at switching frequencies f1, f5, f3, f2, f4. The varied order of the switching frequencies at different landing pads can facilitate a "coding" in the switching frequency pattern to identify the different landing pads. The computing system 615 can analyze the radio data 650 to identify the particular switching frequencies or modulation schemes and identify the particular landing pad based on the identified switching frequencies or modulation schemes.

In some implementations, the computing system 615 can identify the particular landing pad based on an arrangement of the radar reflectors 610 within the computing system's field of view. For example, in some implementations, the particular landing pad can be associated with an asymmetrical pattern at which a plurality of radar reflectors 610 are placed within a proximity of the particular landing pad. The computing system 615 can identify the asymmetrical pattern based on the radio data 650 and identify the particular landing pad using the asymmetrical pattern.

The computing system 615 can initiate one or more actions 680 (e.g., a maneuver action for the aircraft) at the particular landing pad of the aerial facility 605 based on the absolute location 660 of the aircraft 620 and/or, in some implementations, the relative location 665 of the aircraft 620 with respect to the particular landing pad.

The action 680 (e.g., a maneuver action) can include at least one of (i) providing a navigation instruction for navigating the aircraft to the particular landing pad; (ii) providing a landing assistance instruction for indicating a relative location of the aircraft with respect to the particular landing pad; or (iii) providing a motion control for controlling motion of the aircraft relative to the particular landing pad.

The navigation instruction for navigating the aircraft to the particular landing pad, for example, can include control instructions for operating the aircraft 620. The control instructions, for example, can control one or more aircraft propulsion systems to move the aircraft 620 relative to the particular landing pad. For example, the control instructions can cause the propulsion system to move the aircraft 620 in a direction indicated by the relative location 665 of the aircraft 620 with respect to the landing pad. In addition, or alternatively, the control instructions can cause the propulsion system to move the aircraft to decrease the distance between the aircraft 620 and the particular landing pad as indicated by the relative location 665 of the aircraft with respect to the landing pad.

The landing assistance instruction for indicating a relative location 665 of the aircraft 620 with respect to the particular landing pad can include output instructions for providing aircraft location information to an operator of the aircraft 620 or facility personnel at the aerial facility 605. For example, the output instructions can indicate a direction of travel for the aircraft 620 to approach the particular landing pad. In addition, or alternatively, the output instructions can indicate a distance between the aircraft 620 and the particular landing pad. In some implementations, the output instructions can indicate one or more aircraft maneuvers for placing the aircraft 620 in a position for landing at the particular landing pad.

For implementations in which the aircraft 620 is autonomously operated, the motion control instruction can be configured to control motion of aircraft 620 to perform at least one of an approach maneuver, a final descent maneuver, a landing maneuver, a hover maneuver, a takeoff maneuver, an initial ascent maneuver, or a departure maneuver relative to the particular landing pad. For implementations in which the aircraft 620 is manually operated, the motion control instruction can include a confirmation that the aircraft 620 is placed at a position for implementing the desired maneuver relative to the particular landing pad. The motion control instruction, for example, can include an authorization to maneuver the aircraft 620 at the particular landing pad.

In some aspects, the computing system 615 that computes the absolute location 660, relative location 665, action 680, etc. can be located remote from the aircraft 620. For instance, the computing system 615 can be a remote network system (e.g., included in the ATP system 405) and/or included in a system located at the aerial facility 605. In such implementations, the computing system 615 can perform similar functions as described herein (e.g., for an onboard computing system) for a plurality of different aircraft.

When computing system 615 is configured to coordinate among multiple aircraft, the computing system 615 can leverage aerial transportation data 525, first-party vehicle data 550, or third-party vehicle data 565 such as described with reference to FIG. 5. For example, computing system 615 can be configured to help coordinate location determination and maneuver actions for aircraft associated with different entities at different landing pads within an aerial facility. For instance, first-party aircraft 510 of first-party aircraft fleet 505 may only be authorized for landing at a first landing pad (e.g., landing pad 305) while third-party aircraft 520 of third-party aircraft fleet 515 may only be authorized for landing at a second landing pad (e.g., landing pad 310).

In other examples, computing system 615 can be configured to help coordinate location determination and maneuver actions for aircraft based on varying sizes and maneuverability factors associated with respective aircraft and/or landing pads. For example, aerial transportation data 525 can be evaluated by computing system 615 to guide aircraft of a first size to one or more first landing pad locations and aircraft of a second size to a one or more second landing pad locations, where landing pads at the first landing pad locations are different (e.g., larger than or smaller than) landing pads at the second landing pad locations.

Still further, aircraft characteristics (e.g., aircraft size, aircraft performance capabilities, etc.) determined from aerial transportation data 525, first-party vehicle data 550, and/or third-party vehicle data 565 can be used to enhance accuracy of location determination and authorization of actions as described herein. For example, computing system 615 can be configured to calibrate a position of respective aircraft relative to radar reflectors 610 based on size specs of the respective aircraft. Additionally or alternatively, actions can be authorized or not authorized based on landing maneuverability or other aircraft specifications of the respective aircraft.

Figure 9:
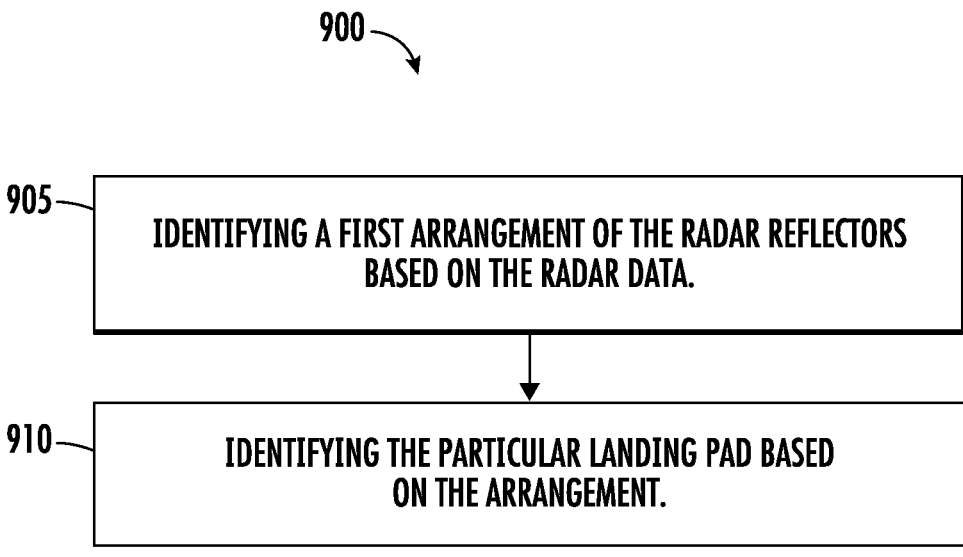
FIG. 9 depicts a flowchart diagram of an example method for identifying a particular landing pad of an aerial facility according to example embodiments of the present disclosure.

FIGS. 7-9 are flowchart diagrams of example methods according to example embodiments of the present disclosure. The methods can be performed by a computing system that includes one or more computing devices such as, for example, the computing systems described with reference to the other figures herein. Each respective portion of the methods can be performed by any (or any combination) of one or more computing devices. Moreover, one or more portions of these methods can be implemented as one or more algorithms on the hardware components of the devices described herein (e.g., as in FIGS. 4-6A, 10, etc.), for example, to compute an absolute location for an aircraft (e.g., using a radar signature), identify a particular landing pad of an aerial facility, etc.

FIGS. 7-9 depict elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

FIGS. 7-9 are described with reference to elements/terms described with respect to other systems and figures for exemplary illustrated purposes and is not meant to be limiting. One or more portions of the methods can be performed additionally, or alternatively, by other systems.

FIG. 7 is a flowchart diagram of an example computer-implemented method 700 for computing a location for an aircraft according to example embodiments of the present disclosure.

At (705), a computing system can transmit one or more radio signals. The one or more radio signals are transmitted using one or more radio transmitters onboard an aircraft traveling relative to an aerial facility and/or one or more landing pads.

At (710), a computing system can receive, using one or more radio receivers onboard an aircraft, reflected radio data corresponding to the one or more radio signals reflected from a plurality of radio detection and ranging ("radar") reflectors placed at a plurality of locations associated with an aerial facility (e.g., at or near the aerial facility).

In some implementations, the plurality of radar reflectors from which radio data is reflected and received at (710) are a subset of a superset of radar reflectors located on the aerial facility that are within a field of view of the plurality of radio receivers and/or radio transmitters onboard the aircraft. As such, the location for the aircraft is based on the subset of reflectors that are within the field of view of the plurality of radio receivers and/or radio transmitters onboard the aircraft.

At (715), a computing system can compute a location for the aircraft based on the reflected radio data and the plurality of locations of the aerial facility at which the radar reflectors are placed.

In some implementations of method 700, computing a location for the aircraft at (715) can include computing a relative location for the aircraft, the relative location of the aircraft determined in relation to at least one of the particular landing pad or the aerial facility. In such implementation, additional optional operations can include accessing origin data indicative of a coordinate frame in which the relative location for the aircraft is expressed, and computing an absolute location for the aircraft based on the relative location for the aircraft and the origin data indicative of the coordinate frame.

In other implementations of method 700, computing a location for the aircraft at (715) can include computing an absolute location for the aircraft based on the reflected radio data and the plurality of locations associated with the aerial facility at which the plurality of radar reflectors are placed. Additional aspects of example implementations for computing the absolute location for an aircraft are described herein, for example, in FIG. 8.

At (720), a computing system can initiate a maneuver action for the aircraft at a particular landing pad of the aerial facility based on the location computed at (715). In some implementations, the maneuver action initiated at (720) can include at least one of (i) providing a navigation instruction for navigating the aircraft to the particular landing pad; (ii) a landing assistance instruction for indicating a relative location of the aircraft with respect to the particular landing pad; or (iii) a motion control instruction for maneuvering the aircraft relative to the particular landing pad. The motion control instruction can be configured to control at least one of an approach maneuver, a landing maneuver, a hover maneuver, a takeoff maneuver, or a departure maneuver relative to the particular landing pad.

FIG. 8 is a flowchart diagram of an example computer-implemented method 800 for computing an absolute location for an aircraft using a radar signature according to example embodiments of the present disclosure. For example, computing an absolute location for the aircraft can be based on reflected radio data and the plurality of locations of the aerial facility at which the plurality of radar reflectors are placed. One or more of the operations depicted in FIG. 8 can be used as part of the operation (715) in FIG. 7 of computing the location of an aircraft.

At (805), a computing system can identify the reflector signature for a particular reflector from the reflected radar data (e.g., the radio data received at (710) in FIG. 7).

In some implementations, at (815) a computing system can identify the reflector signature by accessing a reflector lookup table to identify the plurality of locations of the aerial facility at which the plurality of radar reflectors are placed. The reflector lookup table accessed at (815) can include reflector data for the plurality of radar reflectors, wherein the reflector data is indicative of a particular location of a particular reflector on the aerial facility.

In some implementations, accessing the reflector lookup table at (815) more particularly includes determining at (805) the reflector signature for the particular reflector from the radar data, computing at (810) a reflector hash for the reflector signature, and identifying at (820), using the reflector hash for the reflector signature, the particular location of the particular reflector on the aerial facility from the reflector lookup table.

At (825), a computing system can compute a distance and/or angle between the aircraft and the particular reflector based on the radar data (e.g., the reflected radio data received at (710) in FIG. 7). The absolute location for the aircraft can then be computed at (715) based on the particular location of the particular reflector on the aerial facility and the distance and/or angle between the aircraft and the particular reflector computed at (825).

FIG. 9 is a flowchart diagram of an example computer-implemented method 900 for identifying a particular landing pad of an aerial facility according to example embodiments of the present disclosure. The operations of method 900 can be implemented, for example, when the plurality of locations of the aerial facility for radar reflectors include a first arrangement of locations that are proximate to a particular landing pad At (905), a computing system can identify a first arrangement of the radar reflectors based on the radar data (e.g., the radio data received at (705) in FIG. 7). In some implementations, the first arrangement of locations of the radar reflectors identified at (905) are proximate to the particular landing pad and are associated with an asymmetrical pattern. In some implementations, the first arrangement of locations of the radar reflectors identified at (905) are based on the geometry of the particular landing pad. In some implementations, the first arrangement of locations of the radar reflectors identified at (905) are based on a surrounding environment of the aerial facility. In some implementations, the first arrangement of locations of the radar reflectors identified at (905) are based on a facility layout of the aerial facility. In some implementations, the first arrangement of locations of the radar reflectors identified at (905) are based on a modulation pattern of reflected radio data received therefrom.

In some implementations, a first set of the plurality of radar reflectors are respectively placed at the first arrangement of locations, wherein the first set of the plurality of radar reflectors include omni-directional passive radar reflectors. The plurality of locations of the aerial facility can further include a second arrangement of locations that are associated with an approach path to the particular landing pad. A second set of the plurality of radar reflectors can be placed at the second arrangement of locations, wherein the second set of the plurality of radar reflectors include directional radar reflectors.

At (910), a computing system can identify the particular landing pad based on the one or more identified arrangements of radar reflectors. For example, the particular landing pad can be identified at (910) based on the first arrangement of radar reflectors identified at (905). The particular landing pad identified (910) can be additionally or alternatively determined based on a second arrangement of radar reflectors (e.g., those associated with an approach path to the particular landing pad as described above).

Figure 10:
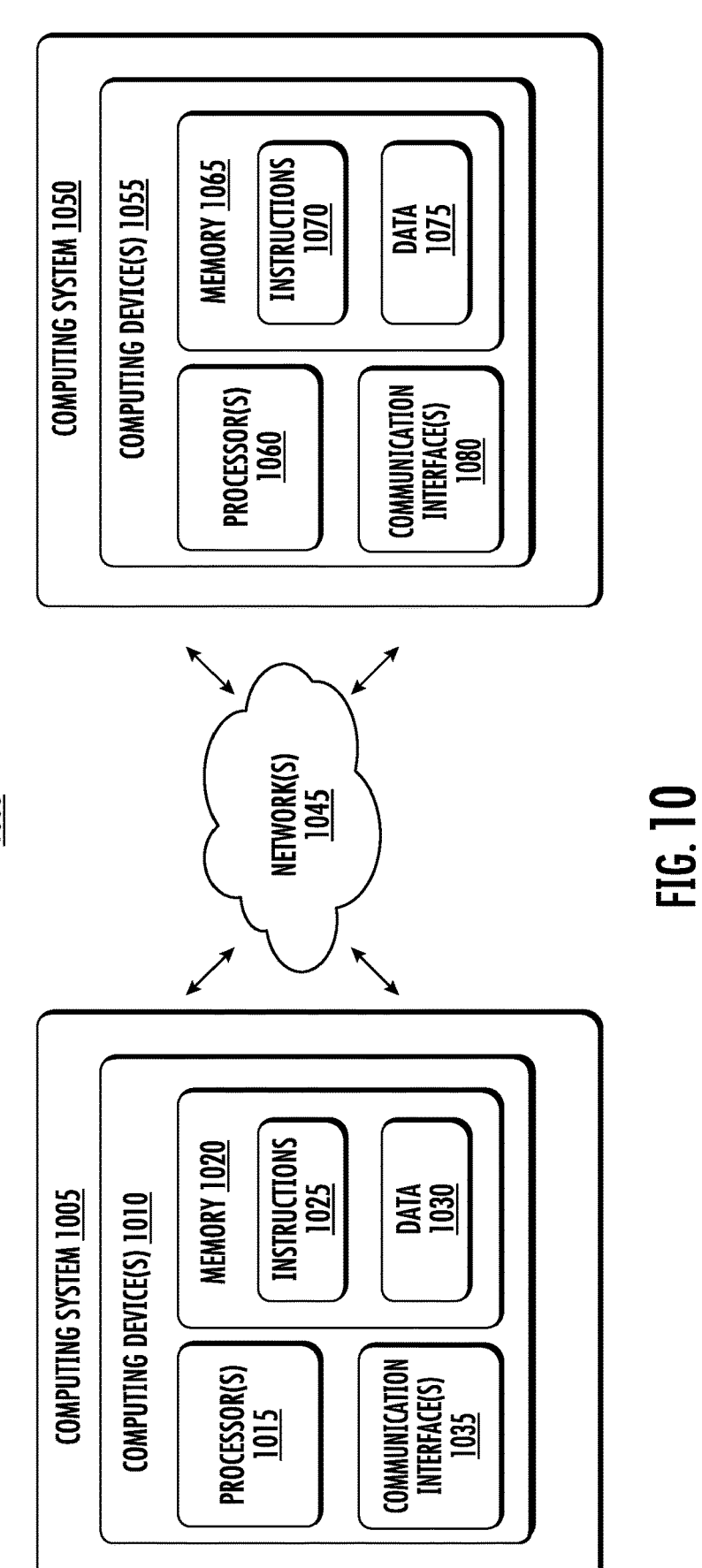
FIG. 10 depicts a block diagram of an example computing system according to example embodiments of the present disclosure.

FIG. 10 depicts example system components of an example system 1000 according to example implementations of the present disclosure. The example system 1000 can include a computing system 1005 and a computing system 1050 that are communicatively coupled over one or more networks 1045. The computing systems 1005 and 1050 can represent, for example, computing systems that are onboard or offboard an aircraft, a cloud computing system, user computing system, or other systems/devices described herein.

The computing system 1005 can include one or more computing devices 1010. The computing devices 1010 of the computing system 1005 can include one or more processors 1015 and a memory 1020. The processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the processors 1015. For instance, the memory 1020 (e.g., one or more non-transitory computer-readable storage mediums, memory devices) can include computer-readable instructions 1025 that can be executed by the processors 1015. The instructions 1025 can be software written in any suitable programming language or can be implemented in hardware. Additionally, or alternatively, the instructions 1025 can be executed in logically and/or virtually separate threads on processors 1015.

For example, the memory 1020 can store instructions 1025 that when executed by the processors 1015 cause the processors 1015 to perform operations such as any of the processes/methods described herein or any of the operations and functions of any of the computing systems (e.g., aerial transportation platform system, ground transportation platform system, third-party provider system, airspace system, computing system 1005, etc.) and/or computing devices (e.g., user devices, ground vehicle devices, aircraft devices, aerial facility devices facility operator user devices, computing device 1010, etc.), as described herein.

The memory 1020 can store data 1030 that can be obtained, received, accessed, written, manipulated, created, and/or stored. The data 1030 can include, for instance, any of the data/information described herein. In some implementations, the computing devices 1010 can obtain from and/or store data in one or more memory devices that are remote from the computing system 1005 such as one or more memory devices of the computing system 1050.

The computing devices 1010 can also include a communication interface 1035 used to communicate with one or more other systems (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the processors 1060. For instance, the memory 1065 (e.g., one or more non-transitory computer-readable storage mediums, memory devices) can store data 1075 that can be accessed e.g., obtained, received, written, manipulated, created, stored, pulled, etc. The data 1075 can include, for instance, any data or information described herein. In some implementations, the computing system 1050 can obtain data from one or more memory devices that are remote from the computing system 1050.

The memory 1065 can also store computer-readable instructions 1070 that can be executed by the processors 1060. The instructions 1070 can be software written in any suitable programming language or can be implemented in hardware. Additionally, or alternatively, the instructions 1070 can be executed in logically and/or virtually separate threads on processors 1060. For example, the memory 1065 can store instructions 1070 that when executed by the processors 1060 cause the processors 1060 to perform any of the operations and/or functions described herein, including, for example, any of the processes/methods described herein or the operations and functions of any of the computing systems (e.g., aerial transportation platform system, ground transportation platform system, third-party provider system, airspace system, computing system 1050, etc.) or computing devices (e.g., user devices, ground vehicle devices, aircraft devices, aerial facility devices facility operator user devices, computing device 1055, etc.), as described herein.

The computing devices 1055 can also include a communication interface 1080 used to communicate with one or more other systems. The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The networks 1045 can be any type of network or combination of networks that allows for communication between devices. In some implementations, the networks 1045 can include one or more of a local area network, wide area network, the Internet, secure network, cellular network, mesh network, peer-to-peer communication link and/or some combination thereof and can include any number of wired or wireless links. Communication over the networks 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at computing devices remote from a vehicle/device can instead be performed at the vehicle/device, or vice versa. Such configurations can be implemented without deviating from the scope of the present disclosure.

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. The term "or" should be understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. At times, elements can be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. can be performed before, after, or in parallel with another operation illustrated by a list identifier of (b), (ii), etc.

What is claimed is:

1. A computer-implemented method comprising:
transmitting, using one or more radio transmitters onboard an aircraft, one or more radio signals;
receiving, using one or more radio receivers onboard the aircraft, reflected radio data corresponding to the one or more radio signals reflected from a plurality of radio detection and ranging ("radar") reflectors placed at a plurality of locations associated with an aerial facility, wherein the plurality of radar reflectors are a subset of a superset of radar reflectors located on the aerial facility that are within a field of view of the one or more radio transmitters and the one or more radio receivers onboard the aircraft;
computing a location for the aircraft based on the reflected radio data and the plurality of locations associated with the aerial facility at which the plurality of radar reflectors are placed, wherein the location for the aircraft is based on the subset of the superset of radar reflectors that are within the field of view of the plurality of radio transmitters and the plurality of radio receivers onboard the aircraft; and
initiating a maneuver action for the aircraft relative to a particular landing pad of the aerial facility based on the location.

2. The computer-implemented method of claim 1, wherein the maneuver action comprises at least one of (i) providing a navigation instruction for navigating the aircraft to the particular landing pad; (ii) providing a landing assistance instruction for indicating a relative location of the aircraft with respect to the particular landing pad; or (iii) providing a motion control instruction for maneuvering the aircraft relative to the particular landing pad.

3. The computer-implemented method of claim 2, wherein the motion control instruction is configured to control at least one of an approach maneuver, a landing maneuver, a hover maneuver, a takeoff maneuver, or a departure maneuver relative to the particular landing pad.

4. The computer-implemented method of claim 1, wherein:
computing the location for the aircraft comprises computing a relative location for the aircraft, the relative location of the aircraft determined in relation to at least one of the particular landing pad or the aerial facility; and
initiating the maneuver action for the aircraft is based on the relative location of the aircraft.

5. The computer-implemented method of claim 4, further comprising:

accessing origin data indicative of a coordinate frame in which the relative location for the aircraft is expressed; and computing an absolute location for the aircraft based on the relative location for the aircraft and the origin data indicative of the coordinate frame;

wherein initiating the maneuver action for the aircraft is based on the absolute location for the aircraft.

6. The computer-implemented method of claim 1, wherein computing the location for the aircraft comprises computing an absolute location for the aircraft based on the reflected radio data and the plurality of locations associated with the aerial facility at which the plurality of radar reflectors are placed, wherein computing the absolute location for the aircraft comprises:

accessing a reflector lookup table to identify the plurality of locations associated with the aerial facility at which the plurality of radar reflectors are placed, wherein the reflector lookup table comprises reflector data for the plurality of radar reflectors, wherein the reflector data is indicative of a particular location of a particular reflector associated with the aerial facility;

computing at least one of a distance or an angle between the aircraft and the particular reflector based on the reflected radio data; and computing the absolute location for the aircraft based on the particular location of the particular reflector on the aerial facility and the at least one of the distance or the angle between the aircraft and the particular reflector.

7. The computer-implemented method of claim 6, wherein the particular reflector is associated with a reflector signature, and wherein accessing the reflector lookup table to identify the plurality of locations associated with the aerial facility at which the plurality of radar reflectors are placed, comprises:

determining the reflector signature for the particular reflector from the reflected radio data;

computing a reflector hash for the reflector signature; and identifying, using the reflector hash for the reflector signature, the particular location of the particular reflector on the aerial facility from the reflector lookup table.

8. The computer-implemented method of claim 1, wherein the plurality of locations associated with the aerial facility comprise a first arrangement of locations that are proximate to the particular landing pad.

9. The computer-implemented method of claim 8, wherein the first arrangement of locations that are proximate to the particular landing pad is configured in an asymmetrical pattern.

10. The computer-implemented method of claim 8, wherein the first arrangement of locations are based on at least one of: a geometry of the particular landing pad, a surrounding environment of the aerial facility, or a facility layout of the aerial facility.

11. The computer-implemented method of claim 8, further comprising:

identifying the first arrangement based on the reflected radio data; and identifying the particular landing pad based on the first arrangement.

12. The computer-implemented method of claim 8, wherein a first set of the plurality of radar reflectors are respectively placed at the first arrangement of locations, wherein the first set of the plurality of radar reflectors comprise omni-directional passive radar reflectors.

13. The computer-implemented method of claim 8, wherein the plurality of locations of the aerial facility comprise a second arrangement of locations that are associated with an approach path to the particular landing pad.

14. The computer-implemented method of claim 13, wherein a second set of the plurality of radar reflectors are placed at the second arrangement of locations, wherein the second set of the plurality of radar reflectors comprise directional radar reflectors.

15. One or more non-transitory, computer-readable media storing instructions that are executable by one or more processors to cause the one or more processors to perform operations, the operations comprising:

transmitting, using one or more radio transmitters onboard an aircraft, one or more radio signals;

receiving, using one or more radio receivers onboard the aircraft, reflected radio data corresponding to the one or more radio signals reflected from a plurality of radio detection and ranging ("radar") reflectors placed at a plurality of locations associated with an aerial facility, wherein the plurality of locations associated with the aerial facility comprise a first arrangement of locations that are proximate to the particular landing pad, and the first arrangement of locations that are proximate to the particular landing pad is configured in an asymmetrical pattern;

computing a location for the aircraft based on the reflected radio data and the plurality of locations associated with the aerial facility at which the radar reflectors are placed; and initiating a maneuver action for the aircraft relative to a particular landing pad of the aerial facility based on the location.

16. The one or more non-transitory, computer-readable media of claim 15, wherein a particular radar reflector of the plurality of radar reflectors is associated with a modulation scheme, and wherein computing the location for the aircraft based on the reflected radio data and the plurality of locations of the aerial facility at which the radar reflectors are placed comprises:

identifying the modulation scheme from the reflected radio data; and computing the location for the aircraft based on a location of the particular radar reflector.

17. The one or more non-transitory, computer-readable media of claim 16, wherein the operations further comprise:

identifying a particular landing pad based on the modulation scheme.

18. The one or more non-transitory, computer-readable media of claim 15, wherein the plurality of radar reflectors comprise at least three radar reflectors and the plurality of locations comprise a respective location for each radar reflector that is proximate to the particular landing pad.

19. An aerial computing system onboard an aircraft, comprising:

one or more processors; and one or more tangible, non-transitory, computer readable media that store instructions that are executable by the one or more processors to cause the aerial computing system to perform operations, the operations comprising:

transmitting, using one or more radio transmitters onboard an aircraft, one or more radio signals;

receiving, using a plurality of radio receivers onboard the aircraft, reflected radio data corresponding to the one or more radio signals reflected from a plurality of radio detection and ranging ("radar") reflectors placed at a plurality of locations associated with an aerial facility, wherein the plurality of locations associated with the aerial facility comprise a first arrangement of locations that are proximate to the particular landing pad, and the first arrangement of locations that are proximate to the particular landing pad is configured in an asymmetrical pattern;

computing a location for the aircraft based on the reflected radio data and the plurality of locations of the aerial facility; and initiating one or more maneuver actions for the aircraft relative to a particular landing pad of the aerial facility based on the location.

\* \* \* \* \*